(12) United States Patent
Shand

(10) Patent No.: US 10,797,460 B2
(45) Date of Patent: Oct. 6, 2020

(54) SYSTEMS AND METHODS FOR LASER POWER INTERLOCKING

(71) Applicant: Waymo LLC, Mountain View, CA (US)

(72) Inventor: Mark Shand, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 455 days.

(21) Appl. No.: 15/209,310

(22) Filed: Jul. 13, 2016

(65) Prior Publication Data

US 2020/0274311 A1    Aug. 27, 2020

(51) Int. Cl.

| | |
|---|---|
| *G01S 7/481* | (2006.01) |
| *G01S 7/484* | (2006.01) |
| *G01S 7/497* | (2006.01) |
| *G01S 17/89* | (2020.01) |
| *G01S 17/93* | (2020.01) |
| *H01S 3/00* | (2006.01) |
| *G02B 26/10* | (2006.01) |
| *G05D 1/02* | (2020.01) |
| *G08G 1/0967* | (2006.01) |

(Continued)

(52) U.S. Cl.
CPC .......... *H01S 3/0071* (2013.01); *G01S 7/484* (2013.01); *G01S 7/4817* (2013.01); *G01S 17/931* (2020.01); *G02B 26/105* (2013.01); *G05D 1/0088* (2013.01); *G05D 1/0248* (2013.01); *G05D 1/0278* (2013.01); *G08G 1/096708* (2013.01)

(58) Field of Classification Search
CPC .. H04N 9/3129; H04N 9/3155; H04N 9/3164; H04N 9/3173; G01S 17/89; G01S 7/4811; G01S 7/4813; G01S 7/497; G01S 17/931; G03B 21/2033; G03B 21/2086; G03B 33/06
See application file for complete search history.

(56) References Cited

U.S. PATENT DOCUMENTS

| | | | |
|---|---|---|---|
| 9,121,703 B1 * | 9/2015 | Droz et al. .............. | G01C 3/08 |
| | | | 356/3.01 |
| 9,300,930 B2 * | 3/2016 | Viswanathan et al. ..................... | |
| | | | H04N 9/3182 |
| | | | 348/687 |

(Continued)

FOREIGN PATENT DOCUMENTS

WO    2016/033036 A2    3/2016

*Primary Examiner* — Daniel L Murphy
(74) *Attorney, Agent, or Firm* — McDonnell Boehnen Hulbert & Berghoff LLP

(57) ABSTRACT

Systems and methods are described that relate to a scanning laser system configured to emit laser light and an interlock circuit communicatively coupled to the scanning laser system. The interlock circuit may carry out certain operations. The operations include, as the scanning laser system emits laser light into one or more regions of an environment around the scanning laser system, determining a respective predicted dosage amount for each region based on the emitted laser light. The operations further include detecting an interlock condition. The interlock condition includes a predicted dosage amount for at least one region being greater than a threshold dose. In response to detecting the interlock condition, the operations include controlling the scanning laser system to reduce a subsequent dosage amount in the at least one region.

18 Claims, 19 Drawing Sheets

(51) Int. Cl.
*G05D 1/00* (2006.01)
*G01S 17/931* (2020.01)

(56) References Cited

U.S. PATENT DOCUMENTS

| | | | |
|---|---|---|---|
| 9,596,440 B2 * | 3/2017 | Viswanathan et al. | ............... H04N 9/3155 353/97 |
| 2006/0109536 A1 | 5/2006 | Mettenleiter et al. | |
| 2008/0084902 A1 | 4/2008 | Walsh et al. | |
| 2010/0020306 A1 | 1/2010 | Hall | |
| 2012/0188440 A1 * | 7/2012 | Takeuchi | ........... G03B 21/2033 |
| 2013/0003026 A1 * | 1/2013 | Rothaar | ............... G03B 21/28 353/85 |
| 2013/0044774 A1 | 2/2013 | Sourani | |
| 2013/0050689 A1 * | 2/2013 | Reich et al. | ......... G01N 21/956 356/237.4 |
| 2016/0047903 A1 * | 2/2016 | Dussan | ............... G01S 7/4861 356/5.01 |
| 2017/0003382 A1 * | 1/2017 | Mellot | ................. G01S 7/487 |

* cited by examiner

Front View

Back View

SYSTEMS AND METHODS FOR LASER POWER INTERLOCKING

BACKGROUND

Unless otherwise indicated herein, the materials described in this section are not prior art to the claims in this application and are not admitted to be prior art by inclusion in this section.

A laser scanning system may emit laser light into an environment. The laser scanning system may emit laser radiation having a time-varying direction, origin or pattern of propagation with respect to a stationary frame of reference. Such systems may use the emitted laser light to map a three dimensional model of their surroundings (e.g., LIDAR).

In some LIDAR applications and laser use-conditions, it may be desirable to adjust an emitted laser light power so as to control or optimize various performance characteristics of the laser scanning system (e.g., signal to noise ratio). In addition, various laser safety guidelines, such as ANSI and/or IEC 60825-1 (May 2014) safety standards, may be applied.

SUMMARY

In an aspect, a system is provided. The system includes a scanning laser system configured to emit laser light and an interlock circuit communicatively coupled to the scanning laser system. The interlock circuit includes a decision unit. The decision unit carries out operations. The operations include, as the scanning laser system emits laser light into one or more regions of an environment around the scanning laser system, determining a respective predicted dosage amount for each region based on the emitted laser light and a pointing direction of the scanning laser system. The operations also include detecting an interlock condition. The interlock condition includes a predicted dosage amount for at least one region being greater than a threshold dose. The operations further include, in response to detecting the interlock condition, controlling the scanning laser system to reduce a subsequent dosage amount in the at least one region.

In an aspect, a method is provided. The method includes determining, at an interlock circuit communicatively coupled to a scanning laser system that is emitting light into one or more regions of an environment around the scanning laser system, a respective predicted dosage amount for each region based on the emitted laser light and a pointing direction of the scanning laser system. The method also includes detecting, at the interlock circuit, an interlock condition. The interlock condition includes a predicted dosage amount for at least one region being greater than a threshold dose. The method further includes, in response to detecting the interlock condition, the interlock circuit controlling the scanning laser system to reduce a subsequent dosage amount in the at least one region.

Other aspects, embodiments, and implementations will become apparent to those of ordinary skill in the art by reading the following detailed description, with reference where appropriate to the accompanying drawings.

DETAILED DESCRIPTION

Figure 1:
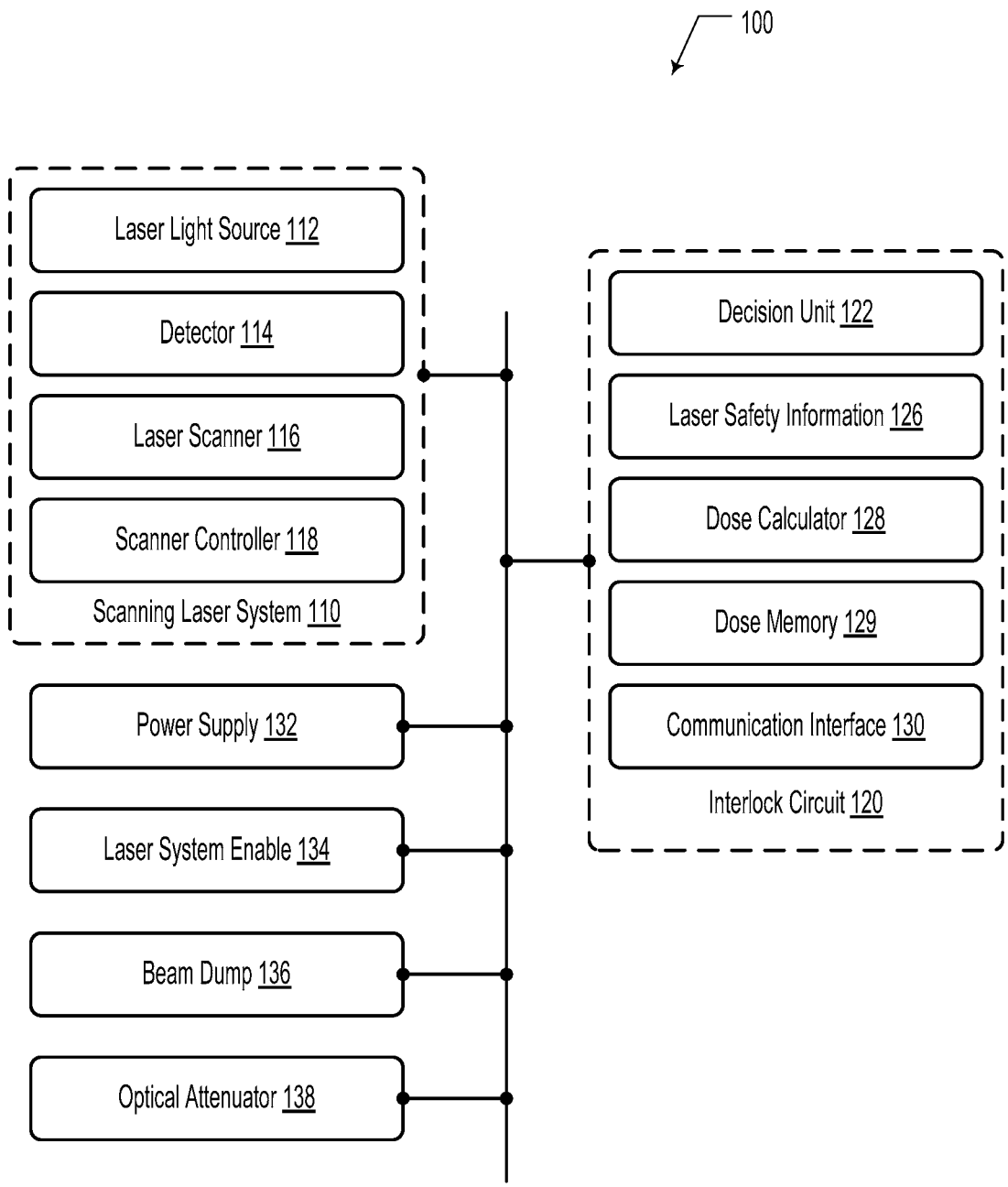
FIG. 1 illustrates a system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

The present disclosure relates to a scanning laser system that emits laser light into regions of the environment and an interlock circuit that controls the scanning laser system when a predicted dosage amount from the laser exceeds (or threatens to exceed) a threshold dose in at least one region. For example, the laser scanning system can be controlled to reduce or stop the emission of laser light into the at least one region. The threshold dose could be based on a laser safety standard, such as IEC 80625-1 Edition 2.0 Class 1. Such a scanning laser system may provide a guarantee that a laser light dose does not exceed a maximum dose set forth in the laser safety standard, even if the system is malfunctioning and/or in the process of being shut down by the interlock circuit.

It can be desirable for the radiated power delivered by the laser scanning system in any particular direction over a given period of time to be limited, to avoid imparting excessive energy to objects in their environment. For example, it is desirable to avoid heating of an object exposed to the laser light from the laser scanning system. Of particular concern are eyes and exposed skin. Acceptable laser light exposure limits have been established through research and set out in various laser safety guidelines. Examples of such laser safety guidelines include the International Electrotechnical Commission publication IEC 60825-1 "Safety of laser products —Part 1: Equipment classification and requirements" and American National Standards Institute (ANSI) Z136.

Furthermore, systems and methods described herein may be operable to abruptly stop emission of laser radiation into an environment in the event of a system malfunction. For example, systems and methods may be configured to stop emission of laser light due to a failure of a mechanical scanning system.

In example embodiments, the interlock circuit may track the mirror position in the laser scanning system on a fine time scale and maintain a record of mirror position by scan position so as to ensure adherence to the constraints set out in the relevant laser safety standard for a class 1 laser at a given operating wavelength (e.g., 980 nm or 1550 nm) while simultaneously imposing power limits on the laser pulse.

Laser light emission may be limited or adjusted in various ways. For example, the scanning system may move the beam to another region so as to not increase the dose to a given region. Additionally or alternatively, the laser scanning system may reduce an output power of the laser or interpose a beam dump or an optical attenuator in the beam path.

System Examples

FIG. 1 illustrates a system 100, according to an example embodiment. System 100 includes a scanning laser system 110 and an interlock circuit 120. The system 100 may additionally include one or more of: a power supply 132, a laser system enable 134, a beam dump 136, and an optical attenuator 138.

The scanning laser system 110 includes a laser light source 112, a detector 114, a laser scanner 116, and a scanner controller 118. In an example embodiment, the scanning laser system 110 may form at least a part of a Light Detection and Ranging (LIDAR) system. That is, the scanning laser system 110 may be configured to provide information about objects in an environment around the scanning laser system 110. Such information provided by the scanning laser system 110 may include an estimated distance to such objects as well as other information, such as, in some cases, a relative velocity of the object, a shape of the object, and/or surface characteristics of the object.

The laser light source 112 may be a device configured to emit light via stimulated emission of electromagnetic radiation. Specifically, the laser light source 112 may include a fiber laser, a solid state laser, a diode laser, a gas laser or another type of laser. The laser light source 112 may be operable to emit pulsed and/or continuous laser light into an environment around the system 100.

The detector 114 may be configured to detect light scattered, refracted, or reflected from objects in an environment of system 100. Specifically, detector 114 may be configured to detect light having the same wavelength and/or pulse characteristics as light emitted by the laser light source 112. For example, the detector 114 may be configured to detect light at 1550 nm or another wavelength of light emitted by the laser light source 112. The detector 114 may include, but need not be limited to, a single photodetector, an array of photodetectors (e.g., a linear array of photodiodes), or an image sensor (e.g., a focal plane array of CCD pixels).

Laser scanner 116 may include a device configured to adjust a beam angle and/or a beam spot position of the laser light emitted into the environment around system 100. Namely, the laser scanner 116 may include a mechanism configured to adjust, modulate, or otherwise modify a beam path of the laser light emitted by laser light source 112. As an example, the mechanism may include a mirror, a spring, and an actuator configured to modulate the laser beam in a vertical orientation. The mechanism may be additionally or alternatively configured to rotate about a rotational base and may include a turret mechanism. That is, the laser beam may be adjusted in a rotational (azimuthal) direction based on a rotational angle of the laser scanner 116. In an alternative embodiment, the laser scanner may include one or more mirrors configured to tilt so as to steer the laser beam in a range of angles/locations. The laser scanner 116 may be implemented in other ways, such as by using piezoelectric materials, electrooptic materials (e.g., devices utilizing the Kerr Effect and/or the Pockels Effect) and/or other types of actuators.

The scanner controller 118 may be operable to provide signals to the laser scanner 116 so as to adjust at least one aspect of the laser scanner 116. That is, the scanner controller 118 may provide electrical signals to the laser scanner 116, which may responsively adjust a position of a mirror or otherwise adjust/modulate a position of the laser beam. In an example embodiment, in response to determining a target scanning region, the scanner controller 118 may provide signals to the laser scanner 116, which may adjust an angle of the laser beam so as to illuminate the target scanning region. In some embodiments, the scanner controller 118 may additionally or alternatively cause the laser beam to illuminate the target scanning region in a boustrophedon (e.g., a zig-zag) or in a point-wise fashion so as to scan across a given region of the environment. In an example embodiment, the target scanning region may include a set of beam emission angles. The beam path may be continuous or discontinuous over the target scanning region.

Although illustrated as being incorporated into, or co-located with, the scanning laser system 110, the scanner controller 118 could be separate from the scanning laser system 110. In other words, a computer or another type of controller 118 may be located at a physically separate location from other elements of the scanning laser system 110.

In an example embodiment, the interlock circuit 120 may be implemented entirely as a dedicated circuit. For example, interlock circuit 120 may include an application-specific integrated circuit (ASIC) and/or a field-programmable gate array (FPGA). Other types of user-programmable circuits, custom circuits, or customizable computers are possible. Additionally or alternatively, the interlock circuit 120 may be implemented by part of the ASIC or FPGA. In such a scenario, the interlock circuit 120 may be a sub-circuit of a larger circuit. As such, the interlock circuit 120 may provide more predictable execution and may be more isolated from interference from other parts of the system, as opposed to implementations with a microprocessor. That is, the interlock circuit 120 may provide adequate isolation to allow it to carry out interlock operations independently of the laser scanning system it is safeguarding. As such, the interlock circuit may include a decision unit 122 that may carry out the operations described herein. However, it is understood that the interlock may additionally or alternatively include at least one processor and a memory. The at least one processor may include one or more general purpose computer processors. The memory may include a non-transitory computer readable medium such as a flash RAM, dynamic RAM, hard disk drive, solid state drive, or another type of memory device. The memory may contain instructions that are executable by the at least one processor. Such instructions, when executed, may enable the at least one processor to carry out various operations, which are described in the present disclosure.

In an example embodiment, the interlock circuit 120 may additionally or alternatively include stored laser safety parameters 126. For example, such information may include laser power thresholds for one or more laser wavelengths to maintain eye-safe conditions in a variety of emission/viewing scenarios. The laser safety parameters 126 may include information regarding laser dosage thresholds, safe operating ranges/limits, for moderate and high-power lasers.

For example, the laser safety parameters 126 may be based, in part or in full, on one or more laser safety standards. Such laser safety standards may include emission limits or operating standards set forth by American National Standards Institute (ANSI) Z136 or the International Electrotechnical Commission (IEC) 60825-1. Other laser safety standards or best practices may be incorporated into the laser safety parameters 126.

The laser safety parameters 126 may include information about various classes of lasers based on their power and wavelength, e.g. as set forth in Title 21 of the Code of Federal Regulations Part 1040 or IEC 60825-1. The laser safety parameters 126 may include different laser dosage thresholds/limits based on an operational class of the laser (e.g., "old system" Class I, IIa, II, IIIa, IIIb, or IV and "new system" Class 1, 1M, 2, 2M, 3R, 3B, and 4).

The laser safety parameters 126 may be expressed assuming a set of exposure conditions. As an example, the laser safety parameters 126 may be provided assuming that the radiant power (W) or radiant energy (J) is detectable through a circular aperture stop having a diameter of 7 millimeters and within a circular solid angle of acceptance of $1 \times 10^{-3}$ steradian with collimating optics of 5 diopters or less. The laser safety parameters 126 may be based on other expected or real-time exposure conditions.

The laser safety parameters 126 may include emission limits in terms of various terms, such as radiant energy, integrated radiance, radiant exposure, or radiant power. Radiant energy includes energy emitted, transferred or received in the form of radiation, expressed in joules (J). Integrated radiance may be a radiant energy per unit area of a radiating surface per unit solid angle of emission, expressed in joules per square centimeter per steradian (J $cm^{-2}$ $sr^{-1}$). Radiant exposure may include a radiant energy incident on an element of a surface divided by the area of the element, expressed in joules per square centimeter (J $cm^{-2}$). Radiant power means time-averaged power emitted, transferred or received in the form of radiation, expressed in watts (W).

The laser safety parameters 126 may additionally or alternatively include information in terms of irradiance, which may be a time-averaged radiant power incident on an element of a surface divided by the area of that element, expressed in watts per square centimeter (W $cm^{-2}$). Other types of laser safety parameters 126 are possible and contemplated herein.

As an illustrative example, the laser safety parameters 126 may be organized according to laser class, such as class 3R. The laser safety parameters 126 may include a wavelength range, such as 1545 nm to 1555 nm. The laser safety parameters 126 may also include information based on one or more sampling periods, such as an exposure time of less than or equal to 0.1 microseconds. For such laser class, emission wavelength, and exposure time conditions, the laser safety parameters 126 may include an allowable emission limit expressed in terms of radiant energy and/or radiant power. As an example, for the above-mentioned values, a Class 3R emission limit may be provided as $7.9 \times 10^{-5}$ J over a given time period. Additionally or alternatively, the laser safety parameters 126 may include one or more wavelength dependent and/or exposure time correction factors, which may be plugged into a more generalized emission limit equation or expression.

The interlock circuit 120 further includes a dose calculator 128, a dose memory 129, and a communication interface 130. The dose calculator 128 may be operable to determine a predicted laser light dose for one or more regions in the environment around the system 100. The dose calculator 128 may make such determinations based on information about the environment, operating conditions of the laser light source 112, position of the laser scanner 116, a slew rate of the laser scanner 116, signals from the scanner controller 118, among other information. As an example, the dose calculator 128 may be configured to calculate a predicted dosage of laser light for a plurality of regions of the environment around the system 100. The predicted dosage amount may be determined by temporally extrapolating from current laser emission operations. That is, the predicted dosage amount may be predicted for one, two, ten, one hundred, or more time periods (e.g., time quantum) in advance. In an example embodiment, a single time quantum could be 588 milliseconds. However, other time quantum values are possible and contemplated.

A predicted dosage amount may be determined for each region in the environment scanned (or predicted to be scanned) by the laser beam. In an example embodiment, the regions may be discretized into a finite set of regions based on possible pointing directions of the laser scanner 116. For instance, during a given time period (e.g., 10 microseconds), the laser scanner 116 may discretize its yaw value as being one of 2000 possible values covering the 360° range of a laser scanning turret. Note that the turret moves much more slowly than 1 discretized yaw position per time period.

In an example embodiment, during a given time period, the dose calculator 128 may update a histogram, which may be stored in the dose memory 129, that includes an entry for all 2000 possible yaw values to record the time spent at a respective yaw value. The histogram may accumulate laser dose information during a given time quantum (588 milliseconds). At the end of each time quantum, the histogram is saved and the histogram memory (e.g., dose memory 129) may be cleared to start a new accumulation cycle in a subsequent time quantum.

As used herein, a pitch amplitude may be defined as an excursion between a minimum and maximum pitch of the laser scanner 116 (e.g., a scanning mirror). In some embodiments, a minimum pitch amplitude may be monitored for each yaw value during each time quantum. Based on the minimum pitch amplitude, a multiplicative derating factor may be applied to each histogram value to provide a conservative estimated exposure for a given yaw value during each time quantum.

In an example embodiment, several prior histograms (e.g., sixteen) may be stored in dose memory 129. In some examples, histogram information corresponding to time periods between 6 and 10 seconds may be stored in dose memory 129. In such a scenario, the last N histograms may be added together to be compared to the laser safety parameters 126. Furthermore, to this result is added the worst additional dose that may be received in one quantum assuming zero yaw (no turret movement) during that period given a minimum pitch amplitude (and corresponding derating factor). If the overall predicted sum is greater than authorized IEC limits (or another type of laser safety standard), the laser light source 112 may be disabled. Note that the shutdown happens preemptively before exceeding a prohibited dose amount (e.g., the threshold dose).

Such operations may be conducted on a continuous sliding window basis and is not limited to time periods aligned with the time quantum boundaries. Furthermore, embodiments herein may complete histogram based checks within 21 milliseconds of the time quantum boundary, which is less than 3.5% of the total time quantum period (when that time period is 588 milliseconds). In some embodiments, extra margin of safety may be incorporated into the authorized limit to allow for the small calculation latency. In an example embodiment, the histogram based checks cover all time periods from 5.88 seconds to 10 seconds. The minimum pitch amplitude and laser maximum power limitations cover all time periods up to 6 seconds. Taken together, these checks may ensure compliance to IEC condition 3 for class 1 laser classification.

Dose calculator 128 may apply one or more filters to the histogram data. For example, a limited support finite impulse response filter may be applied to convert raw histogram counts to a predicted dose for each discretized angle. In an example embodiment, the coefficients of the impulse response filter may be calculated offline (e.g., a priori) and embedded in the circuit that implements the eye-safety interlock check. In such a scenario, the coefficients may depend on a minimum pitch amplitude of the laser turret observed during a given time quantum and the number of quanta under evaluation. The coefficients may additionally or alternatively be based on an aperture of the laser source (e.g., 3 mm). In some embodiments, the coefficients may be constructed conservatively to guarantee a "worst case" estimate of exposure.

Additionally or alternatively, the dose calculator 128 may calculate the predicted dosage amount by using time integration. For example, while the laser light source 112 is emitting light into a given region or sector of the environment, a current laser light flux may be multiplied by an exposure time, which may include a period of time that the laser light is emitted into the given region. The integration may be performed over one or more integration periods, and may account for at least one of: a continuous beam energy, an average beam energy, or a pulse energy. In an example embodiment, for a fiber laser power of 0.84 W, the pulse energy may be 4.0 µJ at 1550 nm.

In some embodiments, the dose calculator 128 may calculate predicted dosage amounts for one or more spectral wavebands and/or wavelengths. Such wavebands and wavelengths may include wavelengths of laser light for which the laser safety parameters 126 may apply. That is, the dose calculator 128 may calculate a predicted dosage amount for wavelengths of laser light that are regulated by one or more safety standards. In some embodiments, the dose calculator 128 may provide a spectral dose profile, which may include a plurality of predicted dosage amounts for a corresponding plurality of wavelengths and/or spectral wavebands.

In some embodiments, the dose calculator 128 may predict dose amounts for a given region of the environment around the system 100 based on a current or planned operating state of the laser light source 112 and a current or planned beam position and/or beam path. That is, the dose calculator 128 may predict an expected dosage amount or spectral dose profile for one or more regions of the environment. The dose calculator 128 may predict such information based on extrapolation from a current or expected operating condition or based on a look-up table or calibration condition.

The dose calculator 128 and/or the decision unit 122 may be configured to detect an interlock condition based on a current or expected dosage amount or spectral dose profile being greater than a threshold dose (or, in some implementations, equal to the threshold dose). In other words, the dose calculator 128 and/or the decision unit 122 may be operable to compare a current or expected dosage amount with a threshold dose, which may be based on the laser safety parameters 126 at the corresponding wavelength or waveband. Accordingly, the dose calculator 128 and/or the decision unit 122 may determine the interlock condition in the cases where the comparison indicates the current or expected dosage amount is greater than (or equal to) a threshold dose based on the laser safety parameters 126.

Although one or more Figures herein illustrate a single laser light source, it is understood that embodiments may include a plurality of laser light sources. For example, the dose calculator 128 may receive information indicative of operating conditions (e.g. laser power), pointing directions (e.g., angle/azimuth data), and/or target information (e.g., beam spot position/location) corresponding to each of the plurality of laser light sources. Accordingly, the dose calculator 128 and/or the decision unit 122 may be configured to detect an interlock condition based on integrating laser light from multiple laser light sources. In an example embodiment, the dose calculator 128 may consider (e.g., integrate) light beams from multiple light sources based on information indicating a similar beam angle and/or beam azimuth. Alternatively or additionally, the dose calculator 128 may calculate a laser light dose based on receiving information indicative of a plurality of beam spots corresponding to (e.g., impinging upon) a given region of space, which may include a given surface area, or a given volume. As such, the dose calculator 128 may be operable to calculate an aggregate predicted laser light dose based on light emitted from a plurality of laser light sources, even if those laser light sources are not co-located.

Power supply 132 may provide electrical power to various elements of system 100. For example, power supply 132 may provide power to the scanning laser system 110 and/or the laser light source 112. In an example embodiment, if an interlock condition is detected, the interlock circuit 120 may cause the laser light source 112 to stop emitting laser light by disconnecting the power supply 132 from the laser light source 112 and/or the scanning laser system 110 via an electrical switch or circuit breaker. That is, the scanning laser system 110 may be controlled so as to reduce the respective subsequent dosage amount by disabling the power supply 132.

Laser system enable 134 may include a low voltage (e.g., 5 volt) signal. In an example embodiment, while the scanning laser system 110 or the laser light source 112 are connected to the laser system enable 134, the laser light source 112 may be operable to emit laser light. However, in the scenario in which the laser system enable 134 is disconnected or adjusted to a different voltage, the scanning laser system 110 and/or the laser light source 112 may be configured to disable emission of laser light. In some embodiments, the interlock circuit 120 may disconnect the laser system enable 134 in response to detecting the interlock condition. In other words, the scanning laser system 110 may be controlled so as to reduce the respective subsequent dosage amount in a corresponding region by disabling the scanning laser system (e.g., by removing the laser system enable 134) so that the scanning laser system 110 does not emit laser light.

The beam dump 136 may include an optical beam blocker or beam trap configured to scatter and/or absorb an incident laser beam. In response to detecting an interlock condition, the interlock circuit 120 may be configured to cause the scanning laser system 110 to adjust the system such that the laser light is directed toward the beam dump 136.

The optical attenuator 138 may include a device configured to absorb, reflect, diffuse, scatter, deflect, diffract, or otherwise reduce an energy level of a laser beam. The optical attenuator 138 may include a fiber optic variable optical attenuator, a neutral density filter, a spatial filter, a bandpass filter, or another type of optical power-reducing device. In an example embodiment, the interlock circuit 120 may be configured to cause the optical attenuator 138 to reduce an emitted or transmitted laser power. As an example, such a reduction in the emitted or transmitted laser power may be a result of a filter being introduced in the optical path or by a redirection of the laser beam so as to impinge on the optical attenuator 138.

In other words, the scanning laser system 110 may include an element (e.g., a beam dump, filter, and/or optical attenuator) that can be moved into and out of a beam path of the emitted laser light. In such a scenario, the scanning laser system 110 may be controlled to reduce the respective subsequent dosage amount in the corresponding region by controlling the scanning laser system 110 to move the element into the laser beam path.

As such, controlling the scanning laser system to reduce the respective subsequent dosage amount in the corresponding region may include changing an operating mode of the scanning laser system. For example, changing the operating mode of the scanning laser system may include adjusting a beam path of the scanning laser system. Additionally or alternatively, changing the operating mode may include adjusting a power output of the scanning laser system, or adjusting at least one pulse characteristic of the scanning laser system.

Figure 2A:
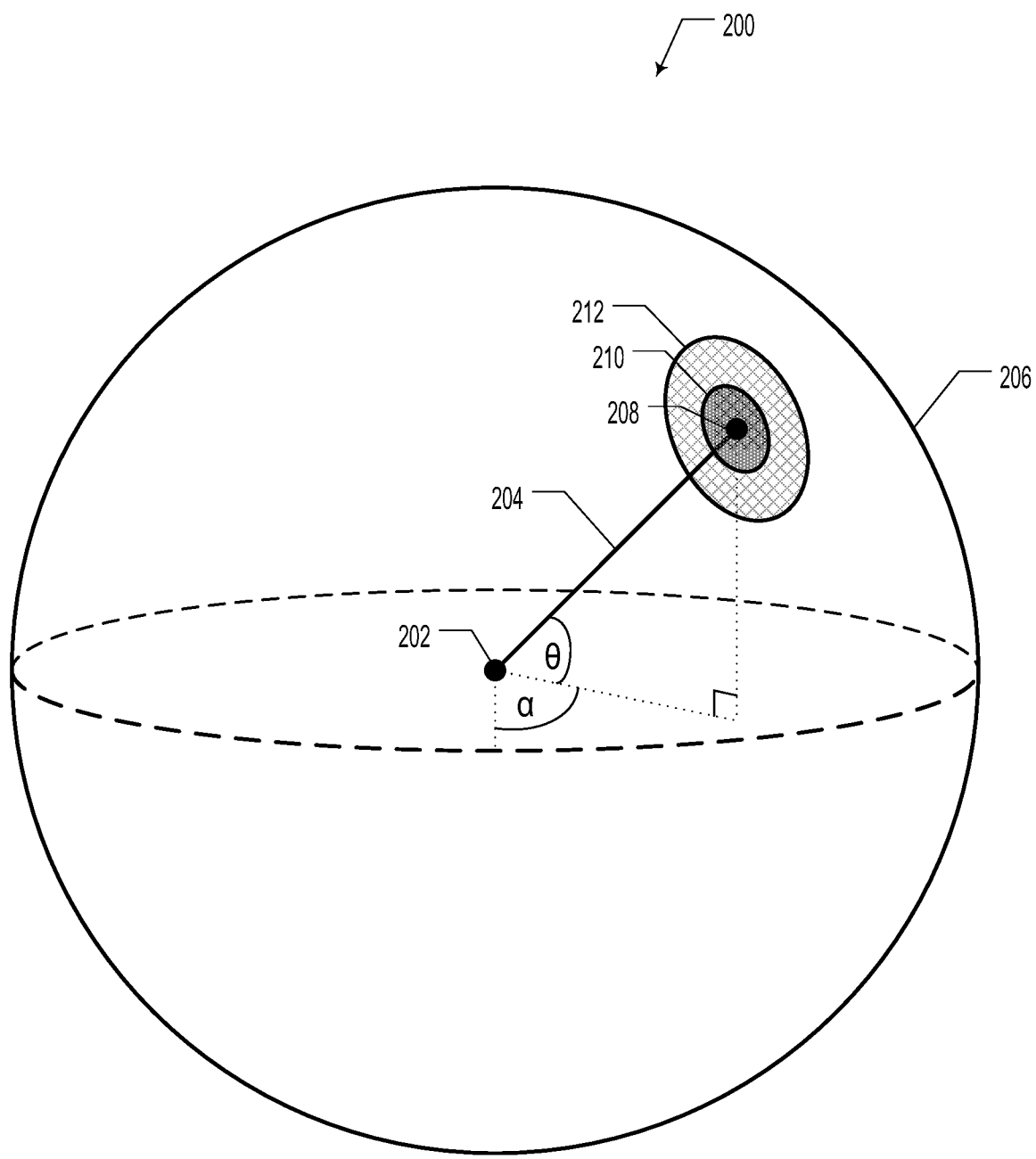
FIG. 2A illustrates a laser light emission scenario, according to an example embodiment.

FIG. 2A illustrates a laser light emission scenario 200, according to an example embodiment. In scenario 200, a laser light source 202 (e.g., laser light source 112 as illustrated and described with regard to FIG. 1) may be located at an origin of an imaginary sphere 206. The laser light source 202 may emit laser light in the form of a laser beam 204 at a given angle θ and azimuth a. The laser beam 204 may intersect the sphere 206 at beam spot 208. The above-described dose calculator 128 may calculate predicted laser light dosage amounts based on a known or predicted diameter of the beam spot 208 along sphere 206, or a local beam region 210. Local beam region 210 may account for beam widening due to atmospheric conditions, beam collimation, diffraction, etc. In some embodiments, the dose calculator 128 may take into account a further margin of safety and calculate the predicted laser light dosage amount based on a larger diameter area 212 along the sphere 206. For example, the larger diameter area 212 may include a "worst case scenario" such as a static (unmoving) laser beam condition or an unexpected laser beam movement. Other beam regions, partial spherical regions, dosage areas, or dosage volumes are possible. In some embodiments, the dose calculator 128 may calculate predicted laser light dosage amounts based on a range of discretized values of beam angle θ and beam azimuth a.

Figure 2B:
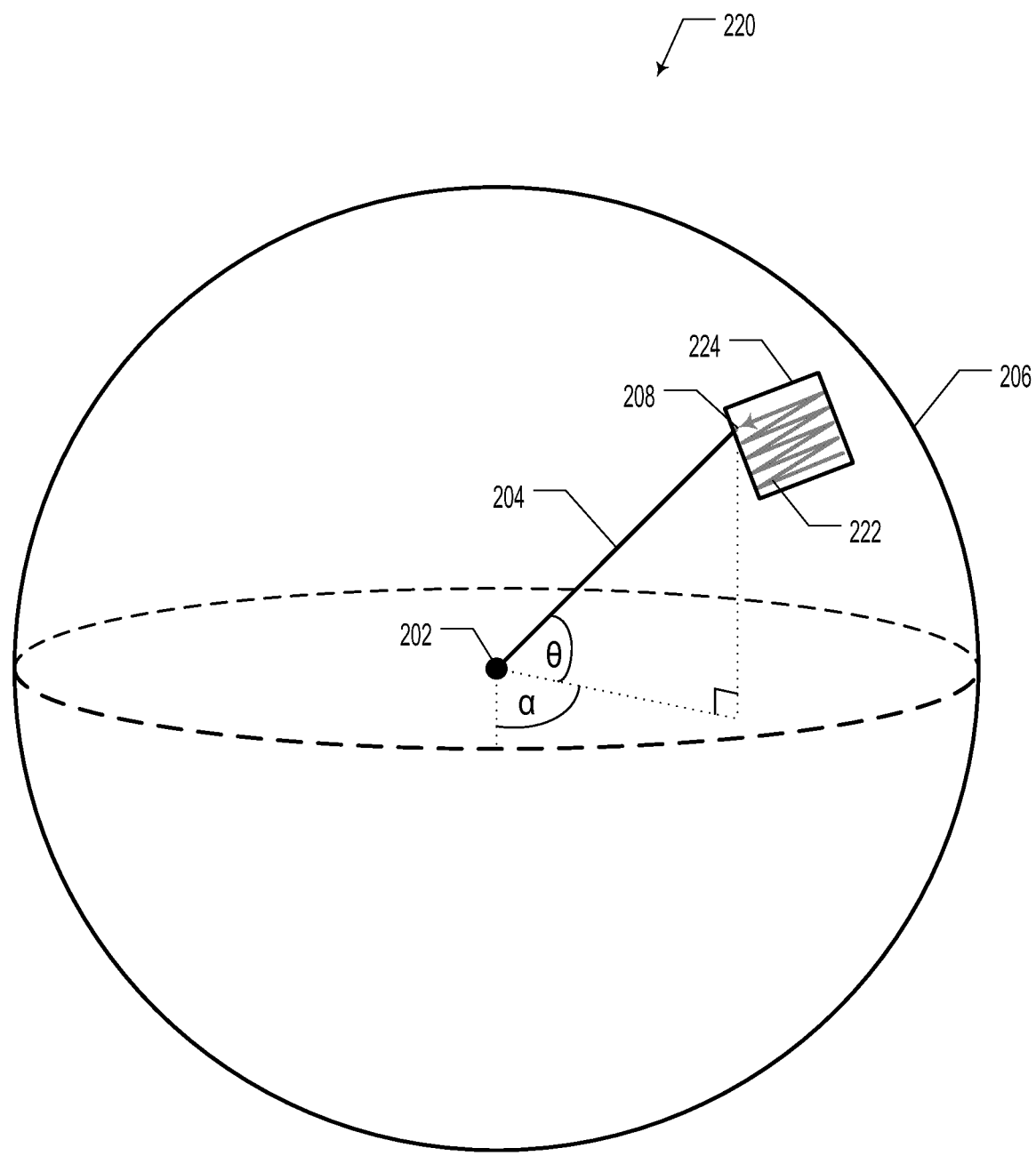
FIG. 2B illustrates a laser light emission scenario, according to an example embodiment.

FIG. 2B illustrates a laser light emission scenario 220, according to an example embodiment. Scenario 220 includes the laser light source 202 being controlled by a scanner (not illustrated) to scan a laser beam 204 and corresponding beam spot 208 along a scanning path 222 within a scanning region 224.

In an example embodiment, the dose calculator 128 may perform predicted dosage calculations based on, for example the scanning speed of the beam spot 208, the scanning path 222, and/or the size of the scanning region 224.

While FIG. 2B illustrates the scanning path 222 as being continuous, it is understood that the scanning path 222, or portions thereof, could be illuminated by continuous or pulsed laser light from the laser light source 202. Furthermore, the laser light source 202 and/or the corresponding laser scanner may scan the laser beam 204 at a fixed and/or variable movement rate along the scanning path.

In some embodiments, the systems and methods described herein may be applied to a laser scanning system incorporated into a vehicle, such as an autonomous automobile. As such, some or all aspects of system 100 as illustrated and described with regard to FIGS. 1, 2A, and 2B may be applied in the context of an autonomous vehicle (e.g., a self-driving car).

Figure 3:
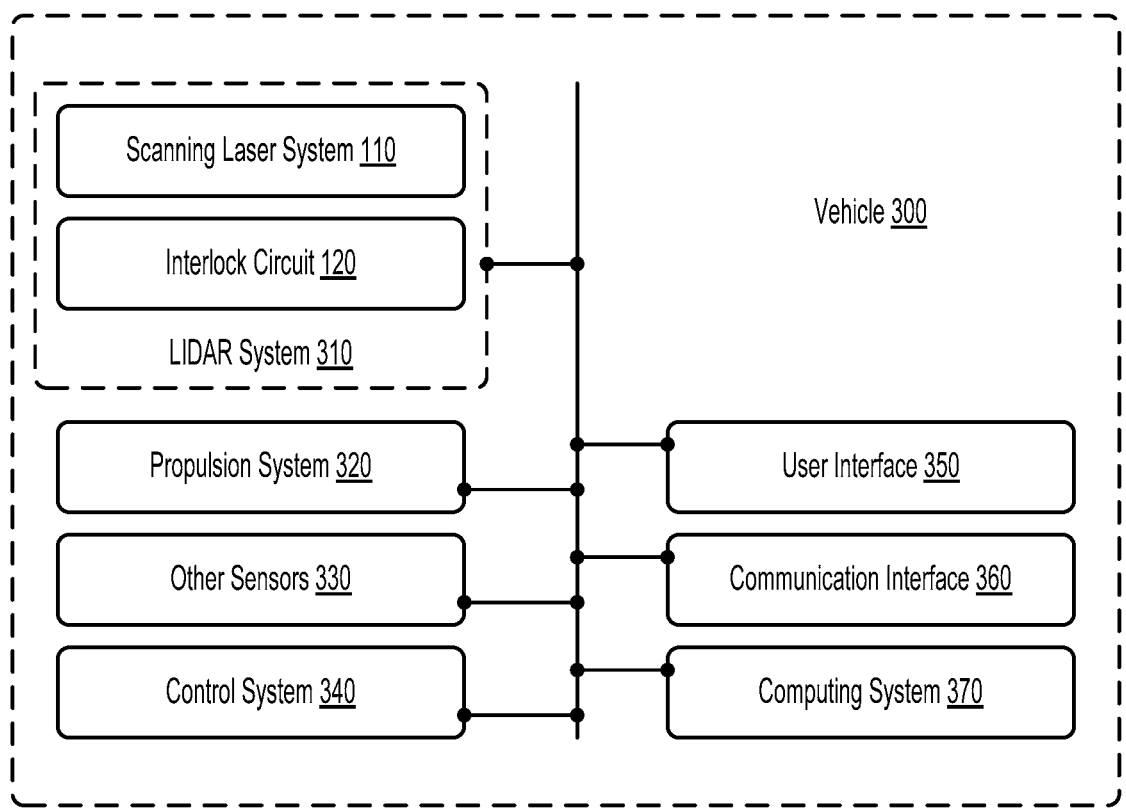
FIG. 3 illustrates a schematic block diagram of a vehicle, according to an example embodiment.

FIG. 3 illustrates a schematic block diagram of a vehicle 300, according to an example embodiment. The vehicle 300 may include a plurality of sensors configured to sense various aspects of an environment around the vehicle. Specifically, vehicle 300 may include a LIDAR system 310 having a plurality of scanning laser systems 110 with different fields of view, ranges, and/or purposes. Some or all of the scanning laser systems 110 of LIDAR system 310 may be associated with and/or controlled by one or more interlock circuits 120, as illustrated and described with regard to FIG. 1.

In one example, the LIDAR system 310 may include a single laser beam having a relatively narrow laser beam spread. The laser beam spread may be about 0.1°×0.03° resolution, however other beam resolutions are possible. The LIDAR system 310 may be mounted to a roof of a vehicle, although other mounting locations are possible.

In such a scenario, the laser beam may be steerable over 360° about a vertical axis extending through the vehicle. For example, the LIDAR system 310 may be mounted with a rotational bearing configured to allow it to rotate about a vertical axis. A stepper motor may be configured to control the rotation of the LIDAR system 310. Furthermore, the laser beam may be steered about a horizontal axis such that the beam can be moved up and down. For example, a portion of the LIDAR system 310, e.g. various optics, may be coupled to the LIDAR system mount via a spring. The various optics may be moved about the horizontal axis such that the laser beam is steered up and down. The spring may include a resonant frequency. The resonant frequency may be around 140 Hz. Alternatively, the resonant frequency may be another frequency. The laser beam may be steered using a combination of mirrors, motors, springs, magnets, lenses, and/or other known means to steer light beams.

In an example embodiment, the scanning laser system 110 of FIG. 3 may include a fiber laser light source that emits 1550 nm laser light, although other wavelengths and types of laser sources are possible. Furthermore, the pulse repetition rate of the LIDAR light source may be 200 kHz. The effective range of LIDAR system 310 may be 300 meters, or more.

The laser beam may be steered by a control system of the vehicle or a control system associated with the LIDAR system 310. For example, in response to the vehicle approaching an intersection, the LIDAR system may scan for oncoming traffic to the left and oncoming traffic to the right. Other sensing scenarios are possible.

In an example embodiment, the LIDAR system 310 may be steered so as to identify particular objects. For example, the LIDAR system 310 may be operable to identify the shoulders or another part of a pedestrian. In another example, the LIDAR system 310 may be operable to identify the wheels on a bicycle.

The LIDAR system 310 described herein may operate in conjunction with other sensors on the vehicle. For example, the LIDAR system 310 may be used to identify specific objects in particular situations. Target information may be additionally or alternatively determined based on data from any one of, or a combination of, other sensors associated with the vehicle.

As a specific example, a general-purpose LIDAR system may provide data related to, for instance, a car passing on the vehicle's right. A controller may determine target information based on the data from the general-purpose LIDAR system. Based on the target information, the controller may cause the LIDAR system disclosed herein to scan for the specific passing car and evaluate the target object with higher resolution and/or with a higher pulse repetition rate.

Vehicle 300 may further include a propulsion system 320 and other sensors 330. Vehicle 300 may also include a control system 340, user interface 350, and a communication interface 360. In other embodiments, the vehicle 300 may include more, fewer, or different systems, and each system may include more, fewer, or different components. Additionally, the systems and components shown may be combined or divided in any number of ways.

The propulsion system 320 may be configured to provide powered motion for the vehicle 300. For example, the propulsion system 320 may include an engine/motor, an energy source, a transmission, and wheels/tires. The engine/motor may be or include any combination of an internal combustion engine, an electric motor, a steam engine, and a Stirling engine. Other motors and engines are possible as well. In some embodiments, the propulsion system 320 may include multiple types of engines and/or motors. For instance, a gas-electric hybrid car may include a gasoline engine and an electric motor. Other examples are possible.

The energy source may be a source of energy that powers the engine/motor in full or in part. That is, the engine/motor may be configured to convert the energy source into mechanical energy. Examples of energy sources include gasoline, diesel, propane, other compressed gas-based fuels, ethanol, solar panels, batteries, and other sources of electrical power. The energy source(s) may additionally or alternatively include any combination of fuel tanks, batteries, capacitors, and/or flywheels. The energy source may include, for example, one or more rechargeable lithium-ion or lead-acid batteries. In some embodiments, one or more banks of such batteries could be configured to provide electrical power.

In some embodiments, the energy source may provide energy for other systems of the vehicle 300 as well.

The transmission may be configured to transmit mechanical power from the engine/motor to the wheels/tires. To this end, the transmission may include a gearbox, clutch, differential, drive shafts, and/or other elements. In embodiments where the transmission includes drive shafts, the drive shafts may include one or more axles that are configured to be coupled to the wheels/tires.

The wheels/tires of vehicle 300 may be configured in various formats, including a unicycle, bicycle/motorcycle, tricycle, or car/truck four-wheel format. Other wheel/tire formats are possible as well, such as those including six or more wheels. In any case, the wheels/tires may be configured to rotate differentially with respect to other wheels/tires. In some embodiments, the wheels/tires may include at least one wheel that is fixedly attached to the transmission and at least one tire coupled to a rim of the wheel that could make contact with the driving surface. The wheels/tires may include any combination of metal and rubber, or combination of other materials. The propulsion system 320 may additionally or alternatively include components other than those shown.

The other sensors 330 may include a number of sensors (apart from the LIDAR system 310) configured to sense information about an environment in which the vehicle 300 is located, and optionally one or more actuators configured to modify a position and/or orientation of the sensors. As a list of non-limiting examples, the other sensors 330 may include a Global Positioning System (GPS), an inertial measurement unit (IMU), a RADAR unit, a rangefinder, and/or a camera. Further sensors may include those configured to monitor internal systems of the vehicle 300 (e.g., an $O_2$ monitor, a fuel gauge, an engine oil temperature, etc.). Other sensors are possible as well.

The GPS may be any sensor (e.g., location sensor) configured to estimate a geographic location of the vehicle 300. To this end, the GPS may include a transceiver configured to estimate a position of the vehicle 300 with respect to the Earth. The GPS may take other forms as well.

The IMU may be any combination of sensors configured to sense position and orientation changes of the vehicle 300 based on inertial acceleration. In some embodiments, the combination of sensors may include, for example, accelerometers and gyroscopes. Other combinations of sensors are possible as well.

The RADAR unit may be any sensor configured to sense objects in the environment in which the vehicle 300 is located using radio signals. In some embodiments, in addition to sensing the objects, the RADAR unit may additionally be configured to sense the speed and/or heading of the objects.

Similarly, the range finder may be any sensor configured to sense a distance to objects in the environment in which the vehicle 300 is located. The camera may be any camera (e.g., a still camera, a video camera, etc.) configured to capture images of the environment in which the vehicle 300 is located. To this end, the camera may take any of the forms described above. The other sensors 330 may additionally or alternatively include components other than those shown.

The control system 340 may be configured to control operation of the vehicle 300 and its components. To this end, the control system 340 may include a steering unit, a throttle, a brake unit, a sensor fusion algorithm, a computer vision system, a navigation or pathing system, and an obstacle avoidance system.

The steering unit may be any combination of mechanisms configured to adjust the heading of vehicle 300. The throttle may be any combination of mechanisms configured to control the operating speed of the engine/motor and, in turn, the speed of the vehicle. The brake unit may be any combination of mechanisms configured to decelerate the vehicle 300. For example, the brake unit may use friction to slow the wheels/tires. As another example, the brake unit may convert the kinetic energy of the wheels/tires to electric current. The brake unit may take other forms as well.

The sensor fusion algorithm may be an algorithm (or a computer program product storing an algorithm) configured to accept data from various sensors (e.g., LIDAR system 310 and/or other sensors 330) as an input. The data may include, for example, data representing information sensed at the various sensors of the vehicle's sensor system. The sensor fusion algorithm may include, for example, a Kalman filter, a Bayesian network, an algorithm configured to perform some of the functions of the methods herein, or any other algorithm. The sensor fusion algorithm may further be configured to provide various assessments based on the data from the sensor system, including, for example, evaluations of individual objects and/or features in the environment in which the vehicle 300 is located, evaluations of particular situations, and/or evaluations of possible impacts based on particular situations. Other assessments are possible as well.

The computer vision system may be any system configured to process and analyze images captured by the camera in order to identify objects and/or features in the environment in which the vehicle 300 is located, including, for example, traffic signals and obstacles. To this end, the computer vision system may use an object recognition algorithm, a Structure from Motion (SFM) algorithm, video tracking, or other computer vision techniques. In some embodiments, the computer vision system may additionally be configured to map the environment, track objects, estimate the speed of objects, etc.

The navigation and pathing system may be configured to determine a driving path for the vehicle 300. The navigation and pathing system may additionally be configured to update the driving path dynamically while the vehicle 300 is in operation. In some embodiments, the navigation and pathing system may be configured to incorporate data from the sensor fusion algorithm, the GPS, the LIDAR system 310, and one or more predetermined maps so as to determine the driving path for vehicle 300.

The obstacle avoidance system may be configured to identify, evaluate, and avoid or otherwise negotiate obstacles in the environment in which the vehicle 300 is located. The control system 340 may additionally or alternatively include components other than those shown.

User interface 350 may be configured to provide interactions between the vehicle 300 and a user. To this end, the user interface 350 may include, for example, a touchscreen, a keyboard, a microphone, and/or a speaker.

The touchscreen may be used by a user to input commands to the vehicle 300. To this end, the touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

The microphone may be configured to receive audio (e.g., a voice command or other audio input) from a user of the vehicle 300. Similarly, the speakers may be configured to output audio to the user of the vehicle 300. The user interface 350 may additionally or alternatively include other components.

The communication interface 360 may be any system configured to provide wired or wireless communication between one or more other vehicles, sensors, or other entities, either directly or via a communication network. To this end, the communication interface 360 may include an antenna and a chipset for communicating with the other vehicles, sensors, servers, or other entities either directly or via a communication network. The chipset or communication interface 360 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities. The communication interface 360 may take other forms as well.

The computing system 370 may be configured to transmit data to, receive data from, interact with, and/or control one or more of the LIDAR system 310, propulsion system 320, the other sensors 330, the control system 340, the user interface 350, and the communication interface 360. To this end, the computing system 370 may be communicatively linked to one or more of the LIDAR system 310, propulsion system 320, the other sensors 330, the control system 340, and the user interface 350 via the communication interface 360, a system bus, network, and/or other connection mechanism.

In one example, the computer system 370 may be configured to store and execute instructions for determining a 3D representation of the environment around the vehicle 300 using the LIDAR system 310. Additionally or alternatively, the computing system 370 may be configured to control operation of the transmission to improve fuel efficiency. As another example, the computing system 370 may be configured to cause the camera to capture images of the environment. As yet another example, the computing system 370 may be configured to store and execute instructions corresponding to the sensor fusion algorithm. Other examples are possible as well.

The computing system 370 may include at least one processor and a memory. The processor may include one or more general-purpose processors and/or one or more special-purpose processors. To the extent the computing system 370 includes more than one processor, such processors could work separately or in combination. The memory may include one or more volatile and/or one or more non-volatile storage components, such as optical, magnetic, and/or organic storage. The memory may be integrated in whole or in part with the processor(s).

Figure 9:
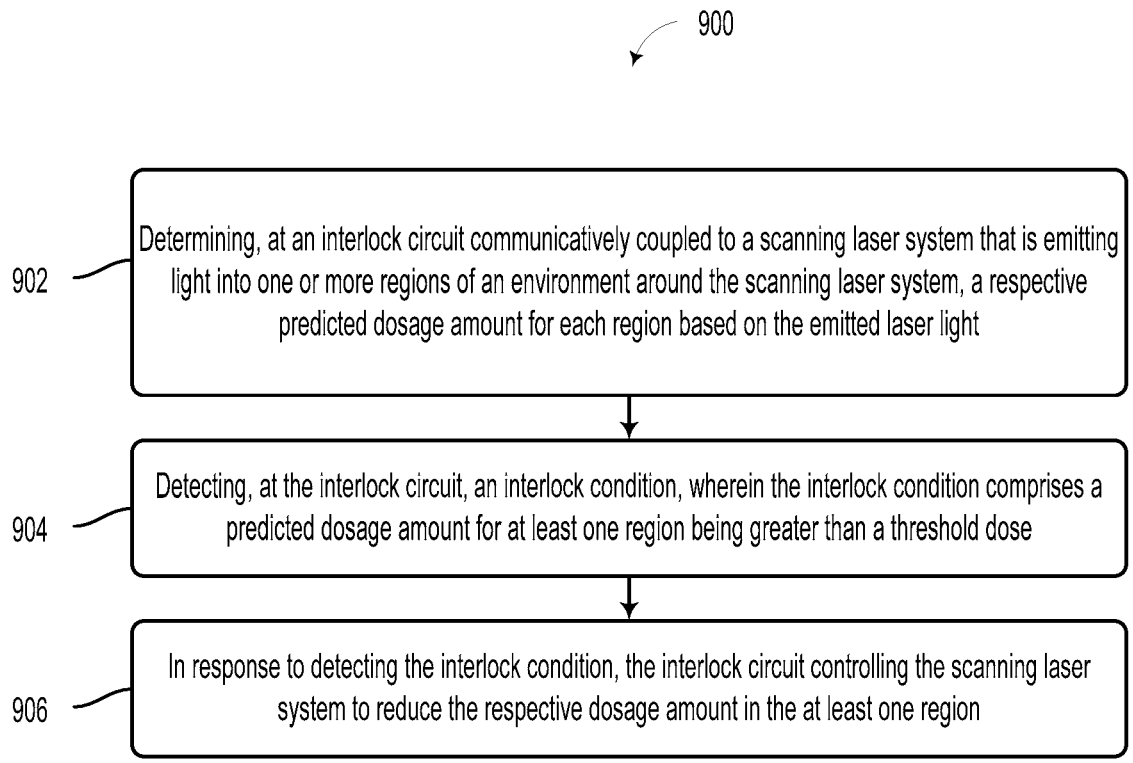
FIG. 9 illustrates a method, according to an example embodiment.

In some embodiments, the memory may contain instructions (e.g., program logic) executable by the processor(s) to execute various functions, such as the blocks described with regard to method 900 and illustrated in FIG. 9. The memory may contain additional instructions as well, including instructions to transmit data to, receive data from, interact with, and/or control one or more of the LIDAR system 310, propulsion system 320, the other sensors 330, the control system 340, and the user interface 350. The computing system 370 may additionally or alternatively include components other than those shown.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

Figure 4A:
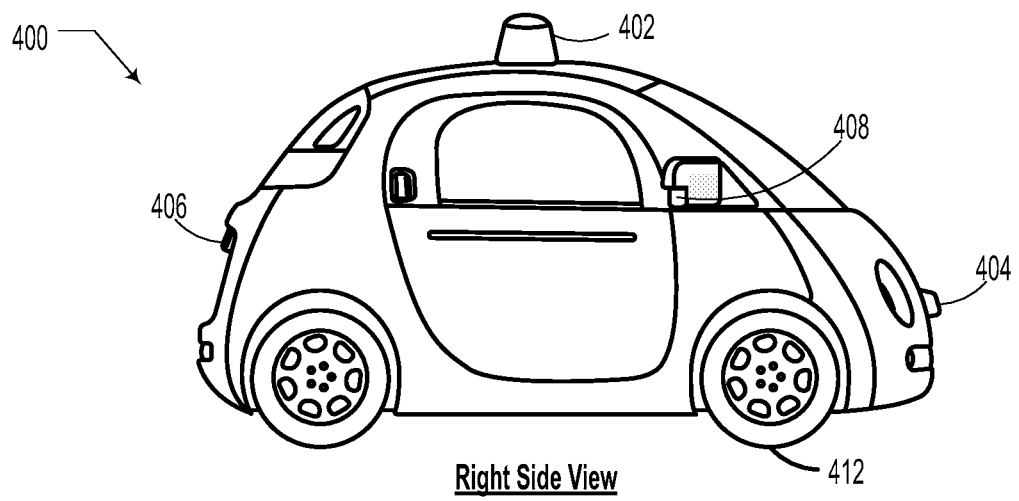
FIGS. 4A to 4D illustrate several views of a vehicle, according to an example embodiment.
Figure 4B:
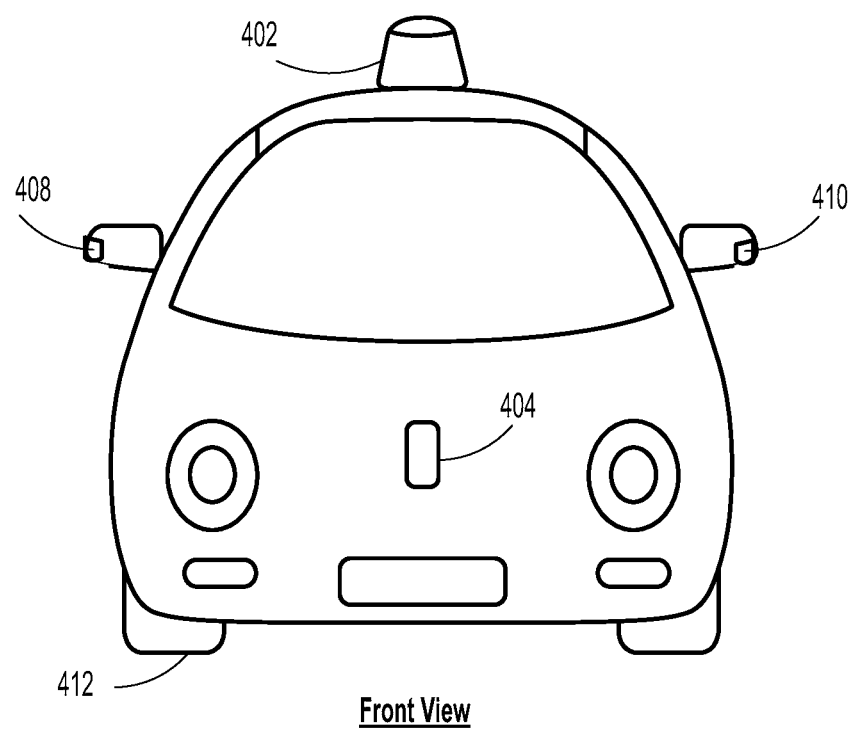
Figure 4C:
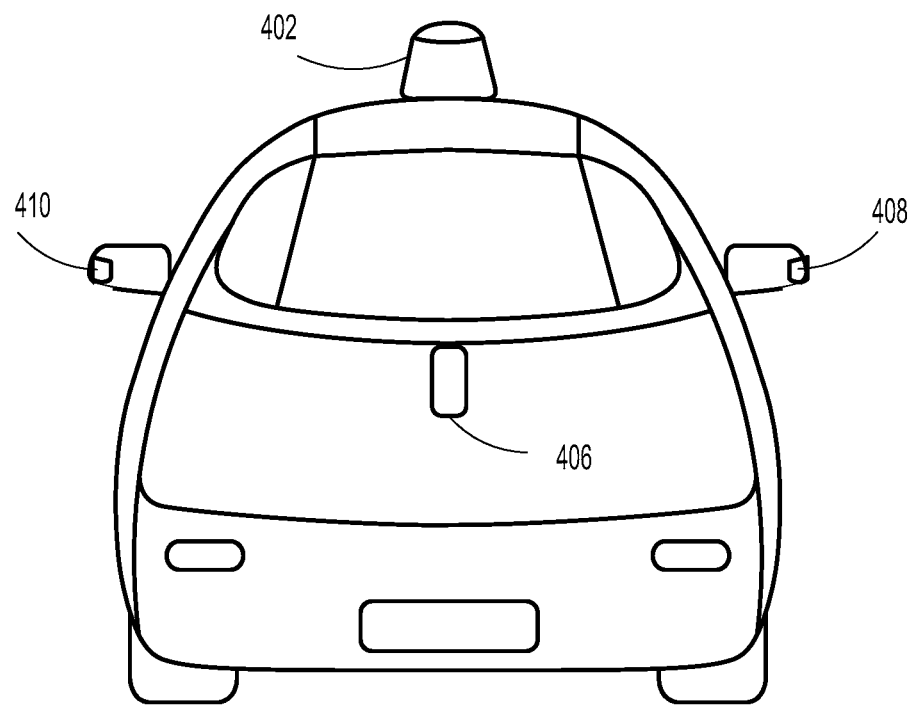
Figure 4D:
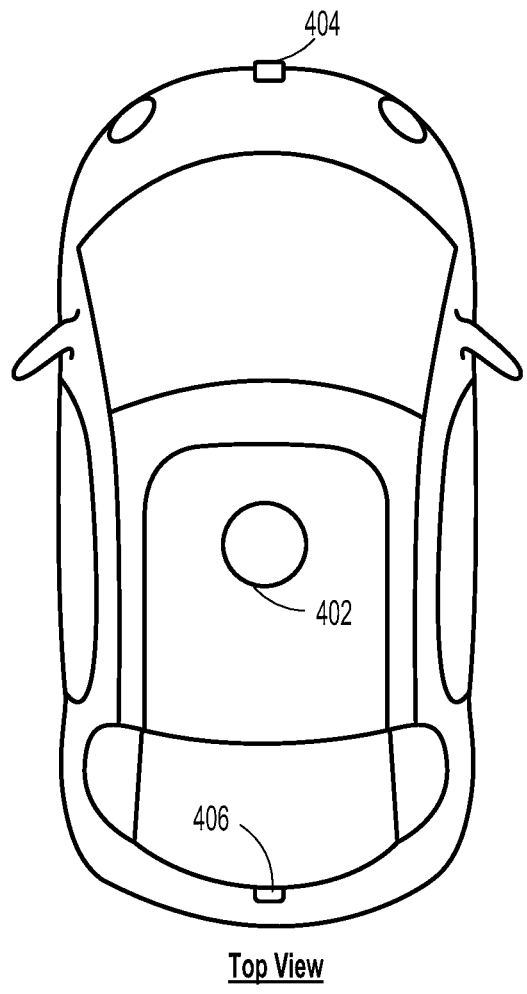
Figure 4E:
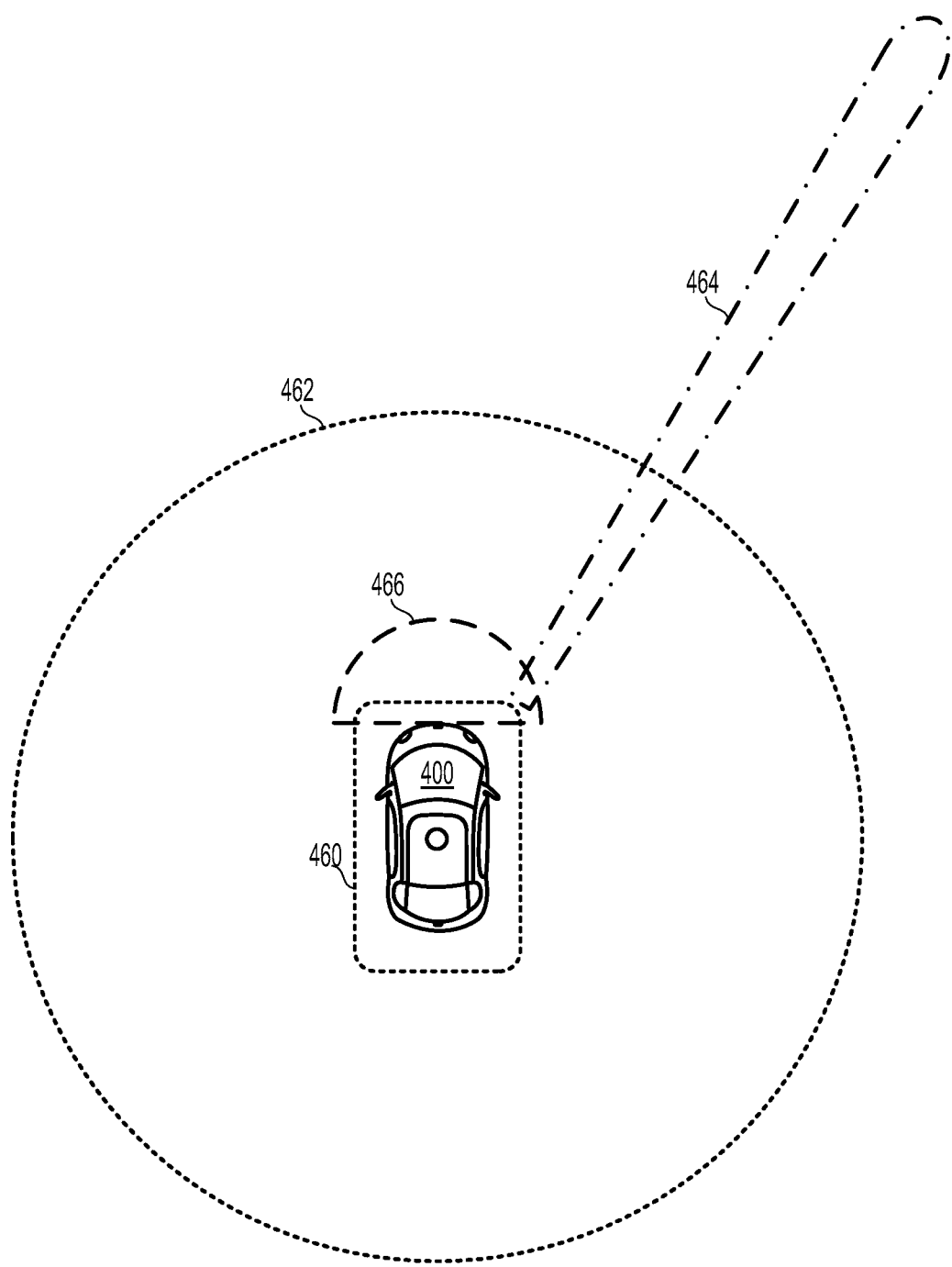
Figure 4G:
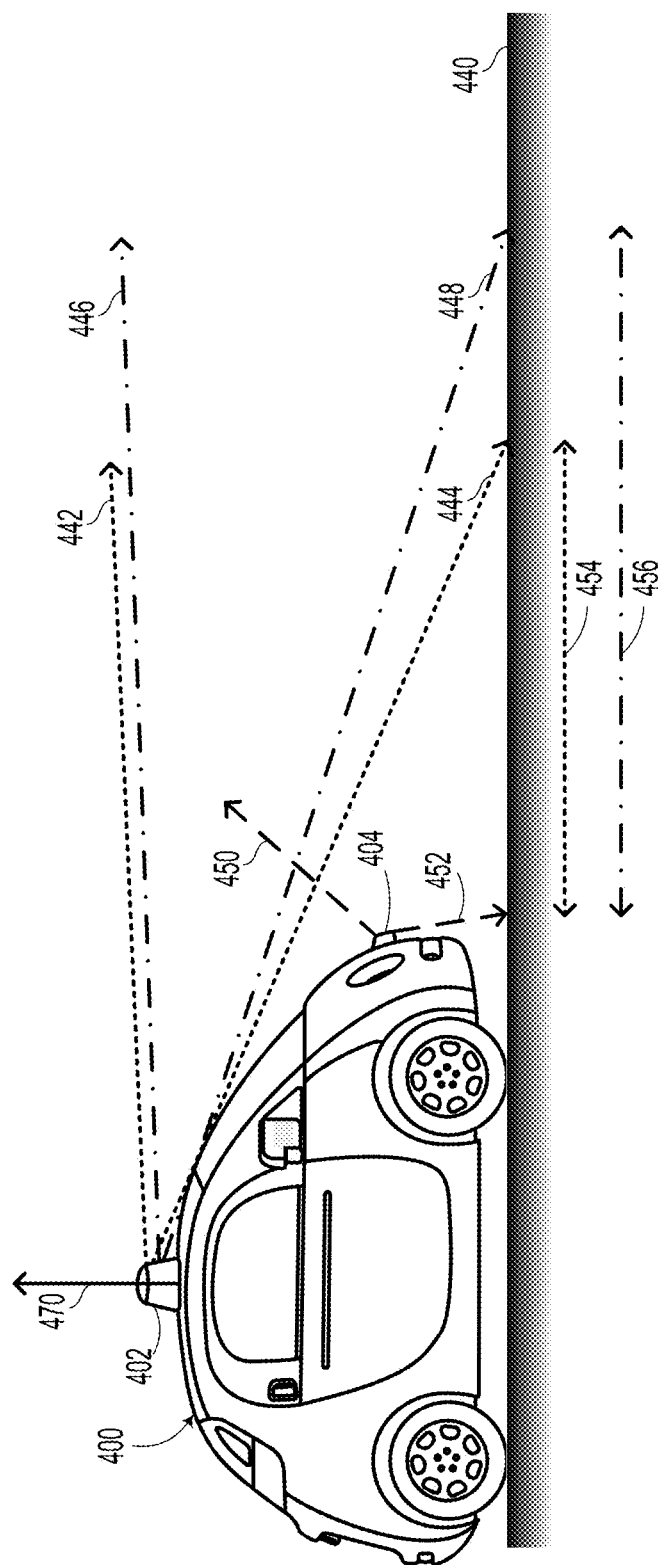

FIGS. 4A-4D illustrate a vehicle 400, according to an example embodiment. In particular, FIG. 4A shows a Right Side View, FIG. 4B shows a Front View, FIG. 4C shows a Back View, and FIG. 4D shows a Top View of the vehicle 400. Although vehicle 400 is illustrated in FIGS. 4A-4D as a car, as discussed above, other embodiments are possible. Furthermore, although the example vehicle 400 is shown as a vehicle that may be configured to operate in autonomous mode, the embodiments described herein are also applicable to vehicles that are not configured to operate autonomously or in both autonomous and non-autonomous modes. Thus, the example vehicle 400 is not meant to be limiting. As shown, the vehicle 400 includes five sensor units 402, 404, 406, 408, and 410, and four wheels, exemplified by wheel 412.

In line with the discussion above, each of the sensor units 402, 404, 406, 408, and 410 may include one or more light detection and ranging devices (LIDARs) that may be configured to scan an environment around the vehicle 400 according to various road conditions or scenarios. Additionally or alternatively, in some embodiments, the sensor units 402, 404, 406, 408, and 410 may include any combination of global positioning system sensors, inertial measurement units, radio detection and ranging (RADAR) units, cameras, laser rangefinders, LIDARs, and/or acoustic sensors among other possibilities.

As shown, the sensor unit 402 is mounted to a top side of the vehicle 400 opposite to a bottom side of the vehicle 400 where the wheel 412 is mounted. Further, the sensor units 404, 406, 408, and 410 are each mounted to a given side of the vehicle 400 other than the top side. For example, the sensor unit 404 is positioned at a front side of the vehicle 400, the sensor 406 is positioned at a back side of the vehicle 400, the sensor unit 408 is positioned at a right side of the vehicle 400, and the sensor unit 410 is positioned at a left side of the vehicle 400.

While the sensor units 402, 404, 406, 408, and 410 are shown to be mounted in particular locations on the vehicle 400, in some embodiments, the sensor units 402, 404, 406, 408, and 410 may be mounted elsewhere on the vehicle 400, either inside or outside the vehicle 400. For example, although FIGS. 4A-4D show the sensor unit 408 mounted to a right-side rear-view mirror of the vehicle 400, the sensor unit 408 may alternatively be positioned in another location along the right side of the vehicle 400. Further, while five sensor units are shown, in some embodiments more or fewer sensor units may be included in the vehicle 400.

In some embodiments, one or more of the sensor units 402, 404, 406, 408, and 410 may include one or more movable mounts on which the sensors may be movably mounted. The movable mount may include, for example, a rotating platform. Sensors mounted on the rotating platform could be rotated so that the sensors may obtain information from various directions around the vehicle 400. For example, a LIDAR of the sensor unit 402 may have a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of the sensor units 402, 404, 406, 408, and 410 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, the vehicle 400 includes one or more wheels such as the wheel 412 that are configured to rotate to cause the vehicle to travel along a driving surface. In some embodiments, the wheel 412 may include at least one tire coupled to a rim of the wheel 412. To that end, the wheel 412 may include any combination of metal and rubber, or a combination of other materials. The vehicle 400 may include one or more other components in addition to or instead of those shown.

Figure 10:
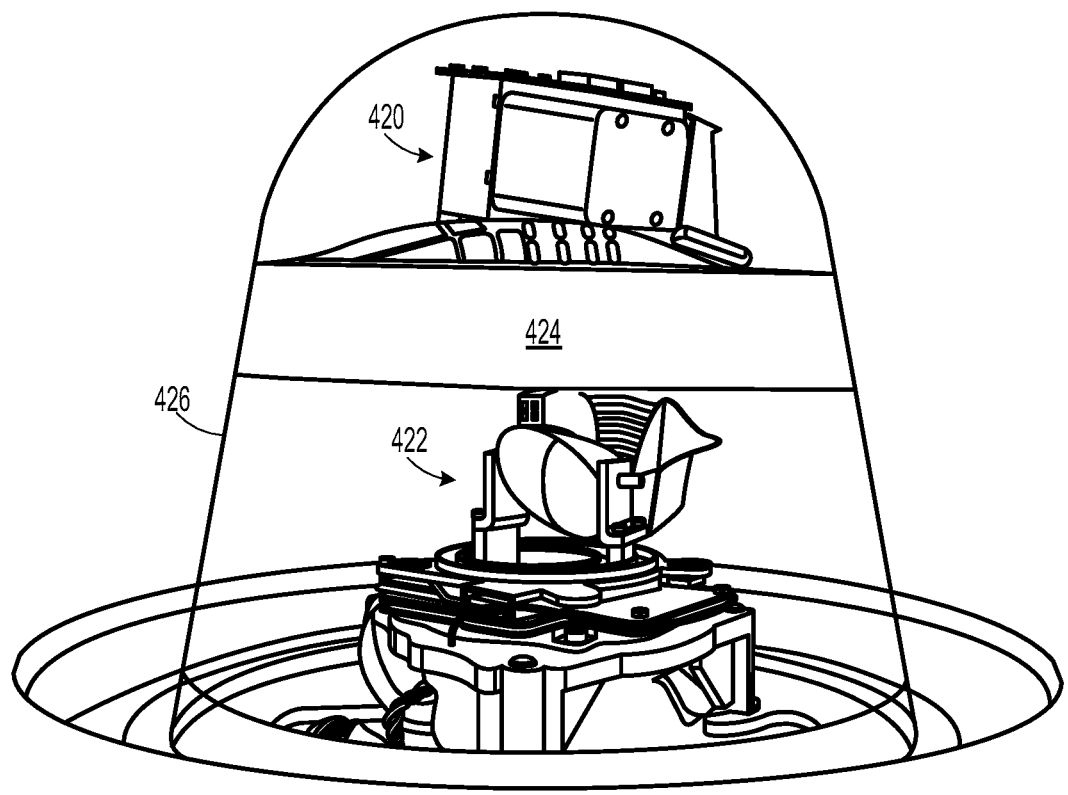
FIG. 10 illustrates a perspective view of a sensor unit, according to an example embodiment.

FIG. 10 is a perspective view of the sensor unit 402 positioned at the top side of the vehicle 400 shown in FIGS. 4A-4D. As shown, the sensor unit 402 includes a first LIDAR 420, a second LIDAR 422, a dividing structure 424, and light filter 426.

In some examples, the first LIDAR 420 may be configured to scan an environment around the vehicle 400 by rotating about an axis (e.g., vertical axis, etc.) continuously while emitting one or more light pulses and detecting reflected light pulses off objects in the environment of the vehicle, for example. In some embodiments, the first LIDAR 420 may be configured to repeatedly rotate about the axis to be able to scan the environment at a sufficiently high refresh rate to quickly detect motion of objects in the environment. For instance, the first LIDAR 420 may have a refresh rate of 10 Hz (e.g., ten complete rotations of the first LIDAR 420 per second), thereby scanning a 360-degree field-of-view (FOV) around the vehicle ten times every second. Through this process, for instance, a 3D map of the surrounding environment may be determined based on data from the first LIDAR 420. In one embodiment, the first LIDAR 420 may include a plurality of light sources that emit 64 laser beams having a wavelength of 905 nm. In this embodiment, the 3D map determined based on the data from the first LIDAR 420 may have a 0.2° (horizontal)×0.3° (vertical) angular resolution, and the first LIDAR 420 may have a 360° (horizontal)×20° (vertical) FOV of the environment. In this embodiment, the 3D map may have sufficient resolution to detect or identify objects within a medium range of 100 meters from the vehicle 400, for example. However, other configurations (e.g., number of light sources, angular resolution, wavelength, range, etc.) are possible as well.

Unlike the first LIDAR 420, in some embodiments, the second LIDAR 422 may be configured to scan a narrower FOV of the environment around the vehicle 400. For instance, the second LIDAR 422 may be configured to rotate (horizontally) for less than a complete rotation about a similar axis. Further, in some examples, the second LIDAR 422 may have a lower refresh rate than the first LIDAR 420. Through this process, the vehicle 400 may determine a 3D map of the narrower FOV of the environment using the data from the second LIDAR 422. The 3D map in this case may have a higher angular resolution than the corresponding 3D map determined based on the data from the first LIDAR 420, and may thus allow detection/identification of objects that are further than the medium range of distances of the first LIDAR 420, as well as identification of smaller objects within the medium range of distances. In one embodiment, the second LIDAR 422 may have a FOV of 8° (horizontal)× 15° (vertical), a refresh rate of 4 Hz, and may emit one narrow beam having a wavelength of 1550 nm. In this embodiment, the 3D map determined based on the data from the second LIDAR 422 may have an angular resolution of 0.1° (horizontal)×0.03° (vertical), thereby allowing detection/identification of objects within a range of around three hundred meters from the vehicle 400. However, other configurations (e.g., number of light sources, angular resolution, wavelength, range, etc.) are possible as well.

In some examples, the vehicle 400 may be configured to adjust a viewing direction of the second LIDAR 422. For example, while the second LIDAR 422 has a narrow horizontal FOV (e.g., 8 degrees), the second LIDAR 422 may be mounted to a stepper motor (not shown) that allows adjusting the viewing direction of the second LIDAR 422 to pointing directions other than that shown in FIG. 10. Thus, in some examples, the second LIDAR 422 may be steerable to scan the narrow FOV along any pointing direction from the vehicle 400.

The structure, operation, and functionality of the second LIDAR 422 are described in greater detail within exemplary embodiments herein.

The dividing structure 424 may be formed from any solid material suitable for supporting the first LIDAR 420 and/or optically isolating the first LIDAR 420 from the second LIDAR 422. Example materials may include metals, plastics, foam, among other possibilities.

The light filter 426 may be formed from any material that is substantially transparent to light having wavelengths with a wavelength range, and substantially opaque to light having wavelengths outside the wavelength range. For example, the light filter 426 may allow light having the first wavelength of the first LIDAR 420 (e.g., 905 nm) and the second wavelength of the second LIDAR 422 (e.g., 1550 nm) to propagate through the light filter 426. As shown, the light filter 426 is shaped to enclose the first LIDAR 420 and the second LIDAR 422. Thus, in some examples, the light filter 426 may also be configured to prevent environmental damage to the first LIDAR 420 and the second LIDAR 422, such as accumulation of dust or collision with airborne debris, among other possibilities. In some examples, the light filter 426 may be configured to reduce visible light propagating through the light filter 426. In turn, the light filter 426 may improve an aesthetic appearance of the vehicle 400 by enclosing the first LIDAR 420 and the second LIDAR 422, while reducing visibility of the components of the sensor unit 402 from a perspective of an outside observer, for example. In other examples, the light filter 426 may be configured to allow visible light as well as the light from the first LIDAR 420 and the second LIDAR 422.

In some embodiments, portions of the light filter 426 may be configured to allow different wavelength ranges to propagate through the light filter 426. For example, an upper portion of the light filter 426 above the dividing structure 424 may be configured to allow propagation of light within a first wavelength range that includes the first wavelength of the first LIDAR 420. Further, for example, a lower portion of the light filter 426 below the dividing structure 424 may be configured to allow propagation of light within a second wavelength range that includes the second wavelength of the second LIDAR 422. In other embodiments, the wavelength range associated with the light filter 426 may include both the first wavelength of the first LIDAR 420 and the second wavelength of the second LIDAR 422.

Figure 11:
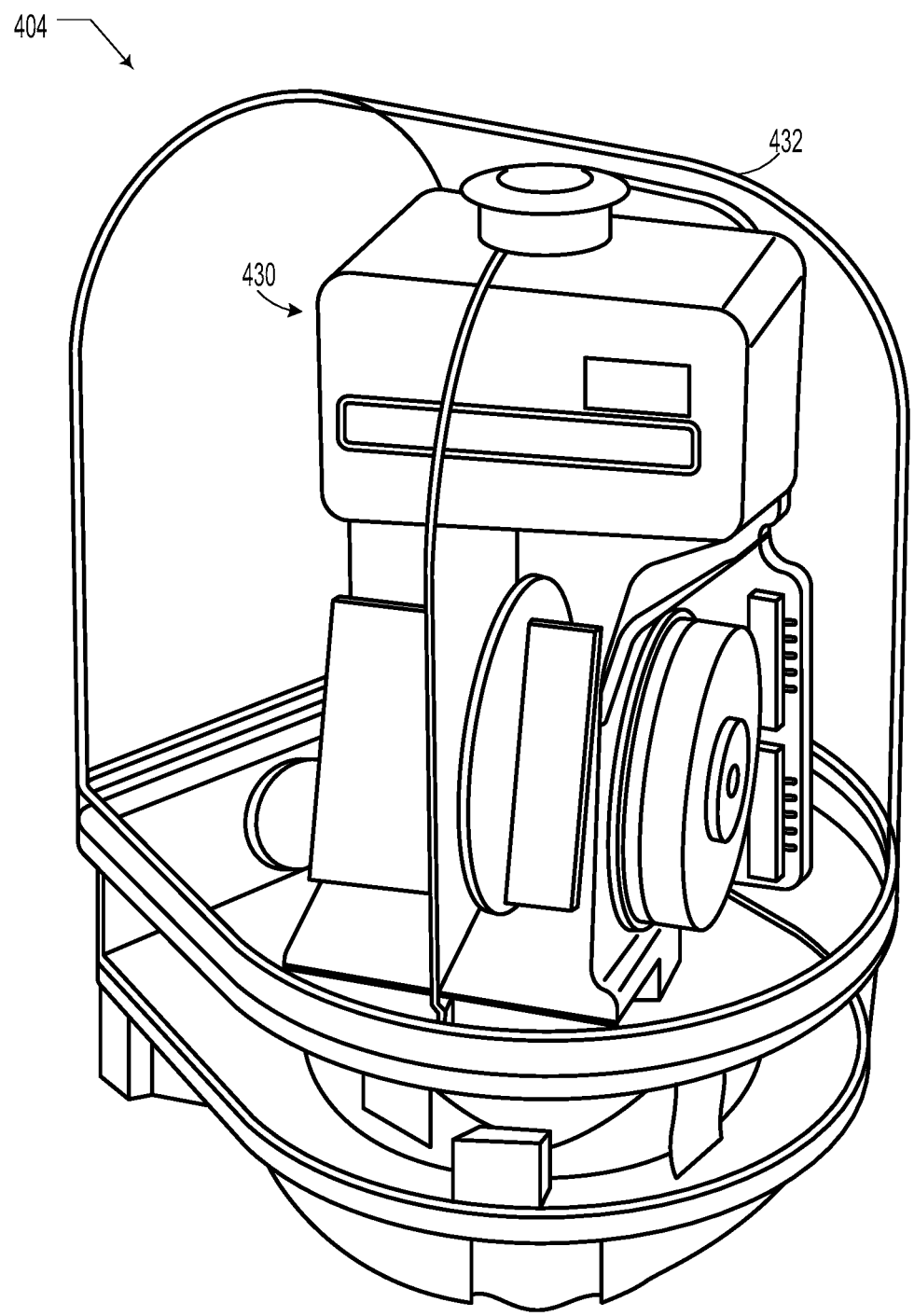
FIG. 11 illustrates a perspective view of a sensor unit, according to an example embodiment.

FIG. 11 is a perspective view of the sensor unit 404 positioned at the front side of the vehicle 400 shown in FIGS. 4A-4D. In some examples, the sensor units 406, 408, and 410 may be configured similarly to the sensor unit 404 illustrated in FIG. 11. As shown, the sensor unit 404 includes a third LIDAR 430 and a light filter 432.

The third LIDAR 430 may be configured to scan a FOV of the environment around the vehicle 400 that extends away from a given side of the vehicle 400 (i.e., the front side) where the third LIDAR 430 is positioned. Thus, in some examples, the third LIDAR 430 may be configured to rotate (e.g., horizontally) across a wider FOV than the second LIDAR 422 but less than the 360-degree FOV of the first LIDAR 420 due to the positioning of the third LIDAR 430. In one embodiment, the third LIDAR 430 may have a FOV of 270° (horizontal)×110° (vertical), a refresh rate of 4 Hz, and may emit one laser beam having a wavelength of 905 nm. In this embodiment, the 3D map determined based on the data from the third LIDAR 430 may have an angular resolution of 1.2° (horizontal)×0.2° (vertical), thereby allowing detection/identification of objects within a short range of 30 meters to the vehicle 400. However, other configurations (e.g., number of light sources, angular resolution, wavelength, range, etc.) are possible as well. The structure, operation, and functionality of the third LIDAR 430 are described in greater detail within exemplary embodiments of the present disclosure.

The light filter 432 may be similar to the light filter 426 of FIG. 10. For example, the light filter 432 may be shaped to enclose the third LIDAR 430. Further, for example, the light filter 432 may be configured to allow light within a wavelength range that includes the wavelength of light from the third LIDAR 430 to propagate through the light filter 432. In some examples, the light filter 432 may be configured to reduce visible light propagating through the light filter 432, thereby improving an aesthetic appearance of the vehicle 400.

Figure 12A:
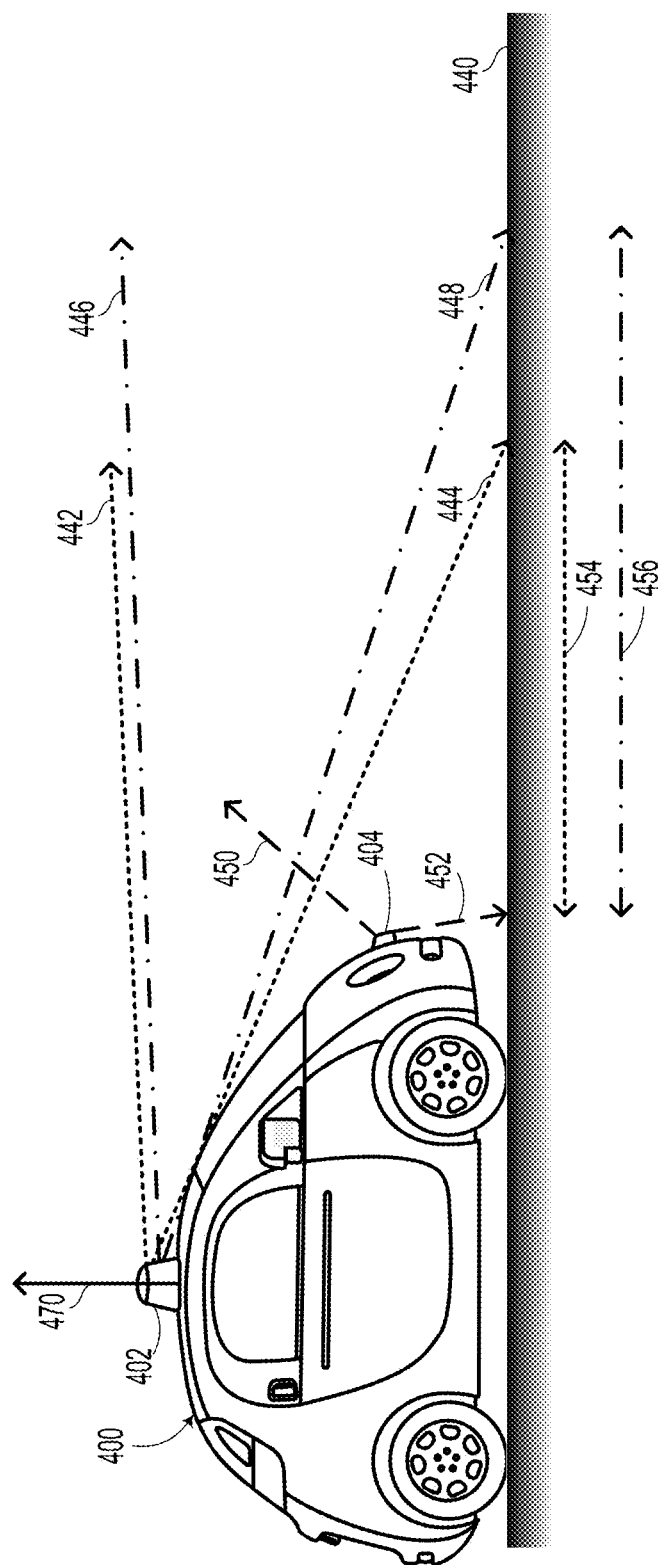
FIG. 12A illustrates a scanning environment around a vehicle, according to an example embodiment.

FIG. 12A illustrates a scenario where the vehicle 400 is operating on a surface 440. The surface 440, for example, may be a driving surface such as a road or a highway, or any other surface. In FIG. 12A, the arrows 442, 444, 446, 448, 450, 452 illustrate light pulses emitted by various LIDARs of the sensor units 402 and 404 at ends of the vertical FOV of the respective LIDAR.

By way of example, arrows 442 and 444 illustrate light pulses emitted by the first LIDAR 420 of FIG. 10. In this example, the first LIDAR 420 may emit a series of pulses in the region of the environment between the arrows 442 and 444 and may receive reflected light pulses from that region to detect and/or identify objects in that region. Due to the positioning of the first LIDAR 420 (not shown) of the sensor unit 402 at the top side of the vehicle 400, the vertical FOV of the first LIDAR 420 is limited by the structure of the vehicle 400 (e.g., roof, etc.) as illustrated in FIG. 12A. However, the positioning of the first LIDAR 420 in the sensor unit 402 at the top side of the vehicle 400 allows the first LIDAR 420 to scan all directions around the vehicle 400 by rotating about a substantially vertical axis 470. Similarly, for example, the arrows 446 and 448 illustrate light pulses emitted by the second LIDAR 422 of FIG. 10 at the ends of the vertical FOV of the second LIDAR 422. Further, the second LIDAR 422 may also be steerable to adjust a viewing direction of the second LIDAR 422 to any direction around the vehicle 400 in line with the discussion. In one embodiment, the vertical FOV of the first LIDAR 420 (e.g., angle between arrows 442 and 444) is 20° and the vertical FOV of the second LIDAR 422 is 15° (e.g., angle between arrows 446 and 448). However, other vertical FOVs are possible as well depending, for example, on factors such as structure of the vehicle 400 or configuration of the respective LIDARs.

As shown in FIG. 12A, the sensor unit 402 (including the first LIDAR 420 and/or the second LIDAR 422) may scan for objects in the environment of the vehicle 400 in any direction around the vehicle 400 (e.g., by rotating, etc.), but may be less suitable for scanning the environment for objects in close proximity to the vehicle 400. For example, as shown, objects within distance 454 to the vehicle 400 may be undetected or may only be partially detected by the first LIDAR 420 of the sensor unit 402 due to positions of such objects being outside the region between the light pulses illustrated by the arrows 442 and 444. Similarly, objects within distance 456 may also be undetected or may only be partially detected by the second LIDAR 422 of the sensor unit 402.

Accordingly, the third LIDAR 430 (not shown) of the sensor unit 404 may be used for scanning the environment for objects that are close to the vehicle 400. For example, due to the positioning of the sensor unit 404 at the front side of the vehicle 400, the third LIDAR 430 may be suitable for scanning the environment for objects within the distance 454 and/or the distance 456 to the vehicle 400, at least for the portion of the environment extending away from the front side of the vehicle 400. As shown, for example, the arrows 450 and 452 illustrate light pulses emitted by the third LIDAR 430 at ends of the vertical FOV of the third LIDAR 430. Thus, for example, the third LIDAR 430 of the sensor unit 404 may be configured to scan a portion of the environment between the arrows 450 and 452, including objects that are close to the vehicle 400. In one embodiment, the vertical FOV of the third LIDAR 430 is 110° (e.g., angle between arrows 450 and 452). However, other vertical FOVs are possible as well.

It is noted that the angles between the various arrows 442-452 shown in FIG. 12A are not to scale and are for illustrative purposes only. Thus, in some examples, the vertical FOVs of the various LIDARs may vary as well.

Figure 12B:
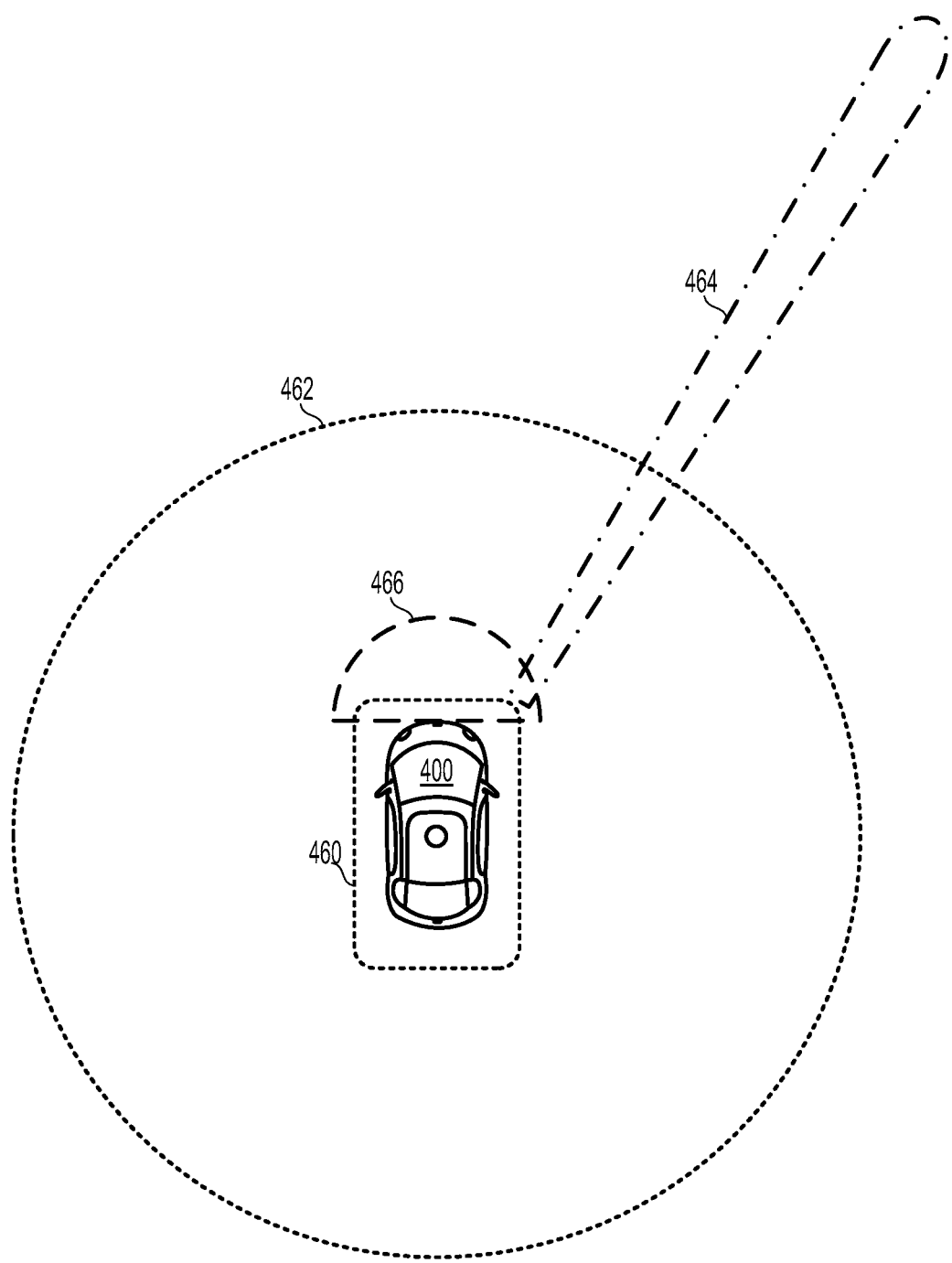
FIG. 12B illustrates a scanning environment around a vehicle, according to an example embodiment.

FIG. 12B illustrates a top view of the vehicle 400 in a scenario where the vehicle 400 is scanning a surrounding environment. In line with the discussion above, each of the various LIDARs of the vehicle 400 may have a particular resolution according to its respective refresh rate, FOV, or any other factor. In turn, the various LIDARs may be suitable for detection and/or identification of objects within a respective range of distances to the vehicle 400.

As shown in FIG. 12B, contours 460 and 462 illustrate an example range of distances to the vehicle 400 where objects may be detected and/or identified based on data from the first LIDAR 420 of the sensor unit 402. As illustrated, for example, close objects within the contour 460 may not be properly detected and/or identified due to the positioning of the sensor unit 402 on the top side of the vehicle 400. However, for example, objects outside of contour 460 and within a medium range of distances (e.g., 100 meters, etc.) defined by the contour 462 may be properly detected/identified using the data from the first LIDAR 420. Further, as shown, the horizontal FOV of the first LIDAR 420 may span 360° in all directions around the vehicle 400.

Further, as shown in FIG. 12B, contour 464 illustrates a region of the environment where objects may be detected and/or identified using the higher resolution data from the second LIDAR 422 of the sensor unit 402. As shown, the contour 464 includes objects further away from the vehicle 400 over a relatively longer range of distances (e.g., 300 meters, etc.), for example. Although the contour 464 indicates a narrower FOV (horizontally) of the second LIDAR 422, in some examples, the vehicle 400 may be configured to adjust the viewing direction of the second LIDAR 422 to any other direction than that shown in FIG. 12B. By way of example, the vehicle 400 may detect an object using the data from the first LIDAR 420 (e.g., within the contour 462), adjust the viewing direction of the second LIDAR 422 to a FOV that includes the object, and then identify the object using the higher resolution data from the second LIDAR 422. In one embodiment, the horizontal FOV of the second LIDAR 422 may be 8°.

Further, as shown in FIG. 12B, contour 466 illustrates a region of the environment scanned by the third LIDAR 430 of the sensor unit 404. As shown, the region illustrated by the contour 466 includes portions of the environment that may not be scanned by the first LIDAR 420 and/or the second LIDAR 424, for example. Further, for example, the data from the third LIDAR 430 has a resolution sufficient to detect and/or identify objects within a short distance (e.g., 30 meters, etc.) to the vehicle 400.

It is noted that the ranges, resolutions, and FOVs described above are for exemplary purposes only, and may vary according to various configurations of the vehicle 400. Further, the contours 460, 462, 464, and 466 shown in FIG. 12B are not to scale but are illustrated as shown for convenience of description.

Figure 5:
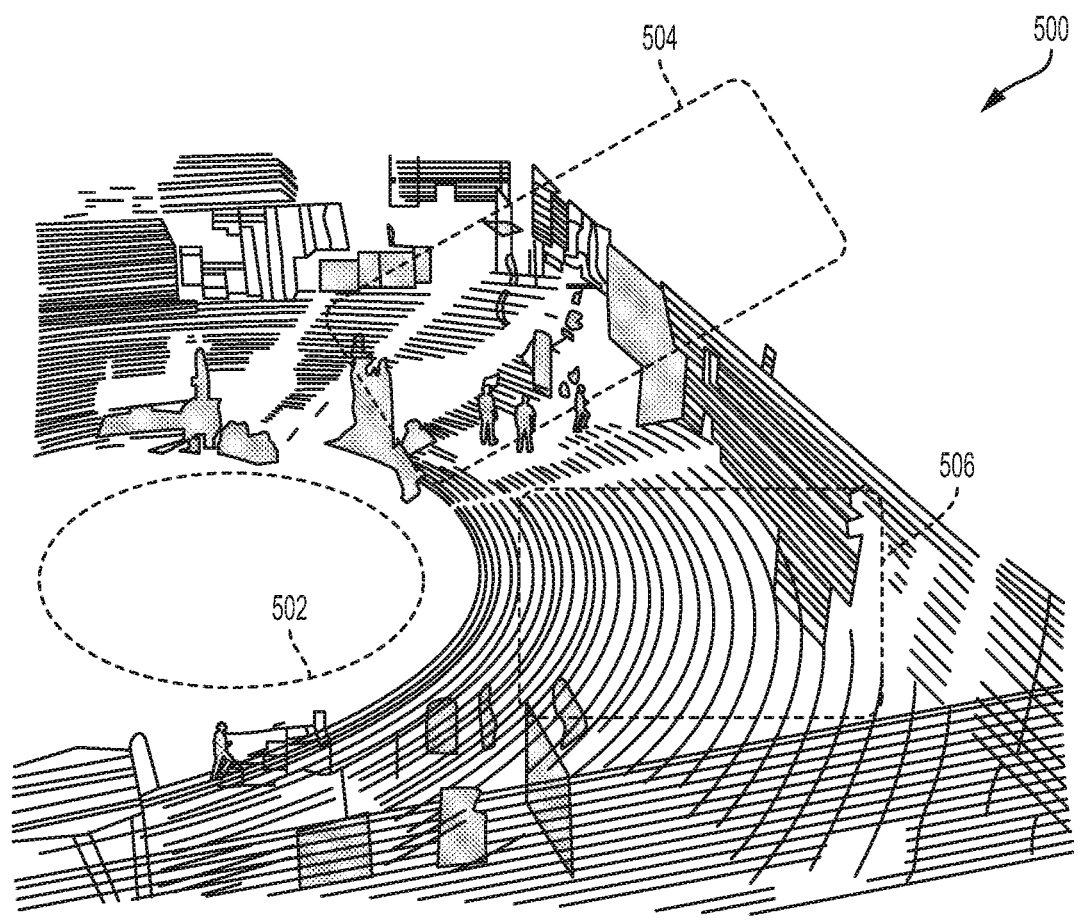
FIG. 5 illustrates a representation of a scene, according to an example embodiment.

FIG. 5 illustrates a representation of a scene 500, according to an example embodiment. Specifically, FIG. 5 may illustrate a portion of a spatial point cloud of an environment based on data from the LIDAR system 310 of FIG. 3A. The spatial point cloud may represent a three-dimensional (3D) representation of the environment around a vehicle. The 3D representation may be generated by a computing device as a 3D point cloud based on the data from the LIDAR system 310 illustrated and described in reference to FIG. 3, LIDAR devices 420, 422, and/or 430 as illustrated and described with reference to FIGS. 10 and 11. Each point of the 3D cloud, for example, may include a reflected light pulse associated with a previously emitted light pulse from one or more LIDAR devices.

Based on the rotation of the scanning laser system 110, the scene 500 includes a scan of the environment in all directions (360° horizontally) as shown in FIG. 5. Further, as shown, a region 502 of the scene 500 does not include any points. For example, the region 502 may correspond to the contour 460 (FIG. 12B) around the vehicle 400 that the LIDAR device may be unable to scan due to positioning at the top side of the vehicle 400. Further, as shown, a region 504 is indicative of objects in the environment of the LIDAR device. For example, the objects in the region 504 may correspond to pedestrians, vehicles, or other obstacles in the environment of the LIDAR device 300. In an example scenario where the LIDAR system 310 is mounted to a vehicle such as the vehicle 300, the vehicle 300 may utilize the spatial point cloud information from the scene 500 to navigate the vehicle away from region 504 towards region 506 that does not include the obstacles of the region 504.

Figure 6:
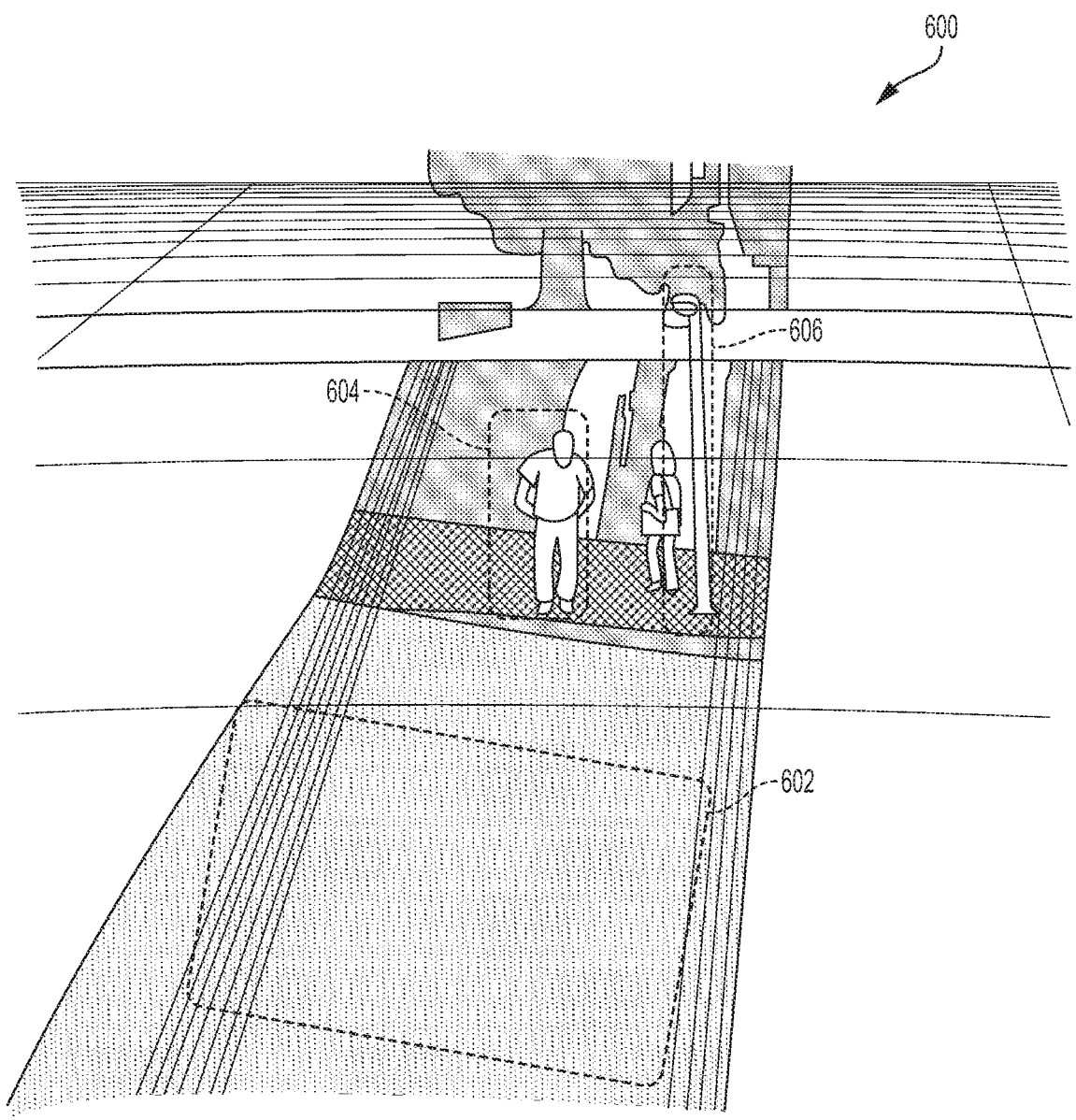
FIG. 6 illustrates a representation of a scene, according to an example embodiment.

FIG. 6 illustrates a representation of a scene 600, according to an example embodiment. In some examples, the representation of scene 600 may be generated based on spatial point cloud data generated by LIDAR system 310 as illustrated and described with regard to FIG. 3, or another LIDAR device described herein.

As shown, the representation of the scene 600 includes a region 602 similar to the region 502 of scene 500 that may represent an unscanned or unscannable region due to the positioning of the LIDAR device at the top side of a vehicle. For example, the region 602 may correspond to the contour 460 of FIG. 12B around the vehicle 400.

Unlike the representation of the scene 500 of FIG. 5, however, the representation of the scene 600 may span a much narrower field-of-view. For example, the FOV scanned by the LIDAR system 310 and illustrated in the representation of the scene 600 may correspond to the contour 464 of FIG. 12B. Due in part to the narrower FOV, the representation of the scene 600 may have a higher resolution than the representation of the scene 500. For instance, points in the point cloud of scene 600 are closer to one another and thus some objects in the environment may be more easily identified compared to the objects in the environment represented by scene 500.

In an example scenario, a vehicle such as the vehicle 400 may include a first LIDAR (e.g., first LIDAR 420) and a second LIDAR (e.g., second LIDAR 422). In the scenario, the vehicle may utilize data from the first LIDAR to generate the representation of scene 500 of FIG. 5. Further, in the scenario, the vehicle may determine that the region 504 of the representation of scene 500 as a region of interest, or a target object/location, for further scanning. In turn, the vehicle in the scenario may adjust a viewing direction of the second LIDAR to scan the region of interest and obtain the representation of scene 600 of FIG. 6. In the scenario, the vehicle may process the representation of scene 600 using a computing process such as an image processing algorithm or a shape detection algorithm. In turn, the vehicle of the scenario may identify an object in region 604 of the representation of scene 600 as a pedestrian, and another object in region 606 as a light post. In the scenario, the vehicle may then navigate accordingly to avoid obstacles.

In one instance, the vehicle may navigate to be within a first threshold distance to the objects if the objects include a pedestrian (e.g., as indicated by region 604), or a lower second threshold distance if the objects include inanimate objects such as the light post (e.g., indicated by region 606) among other possibilities. In another instance, the vehicle may assign the second LIDAR to track the objects if an animate object is identified (e.g., region 604), or may assign the second LIDAR to track other objects if only inanimate objects were identified. Other navigational operations are possible in line with the scenario.

In an example embodiment, the region of interest or target object/location may be determined based on target information. The target information may include a specific object of interest, a pedestrian, another vehicle, an intersection, a traffic signal, a crosswalk, a "blind" spot of a vehicle, or any number of other targets that may be of interest in navigating a vehicle. The target information may be received by a controller of the LIDAR system and may be provided by a sensing device. The sensing device could include another LIDAR system or it could be another type of sensor, such as a camera, an ultrasonic transducer, and/or a RADAR.

Alternatively or additionally, target information may be based on a map of the environment around the vehicle, a location of the vehicle, or a movement of the vehicle. Other target information is possible to assist in vehicle navigation and object avoidance.

Thus, in some examples, a vehicle that includes a combination of sensors and the LIDAR device disclosed herein may utilize the respective characteristics of each sensor such as refresh rate, resolution, FOV, position, etc., to scan the environment according to various road conditions and/or scenarios.

Figure 7:
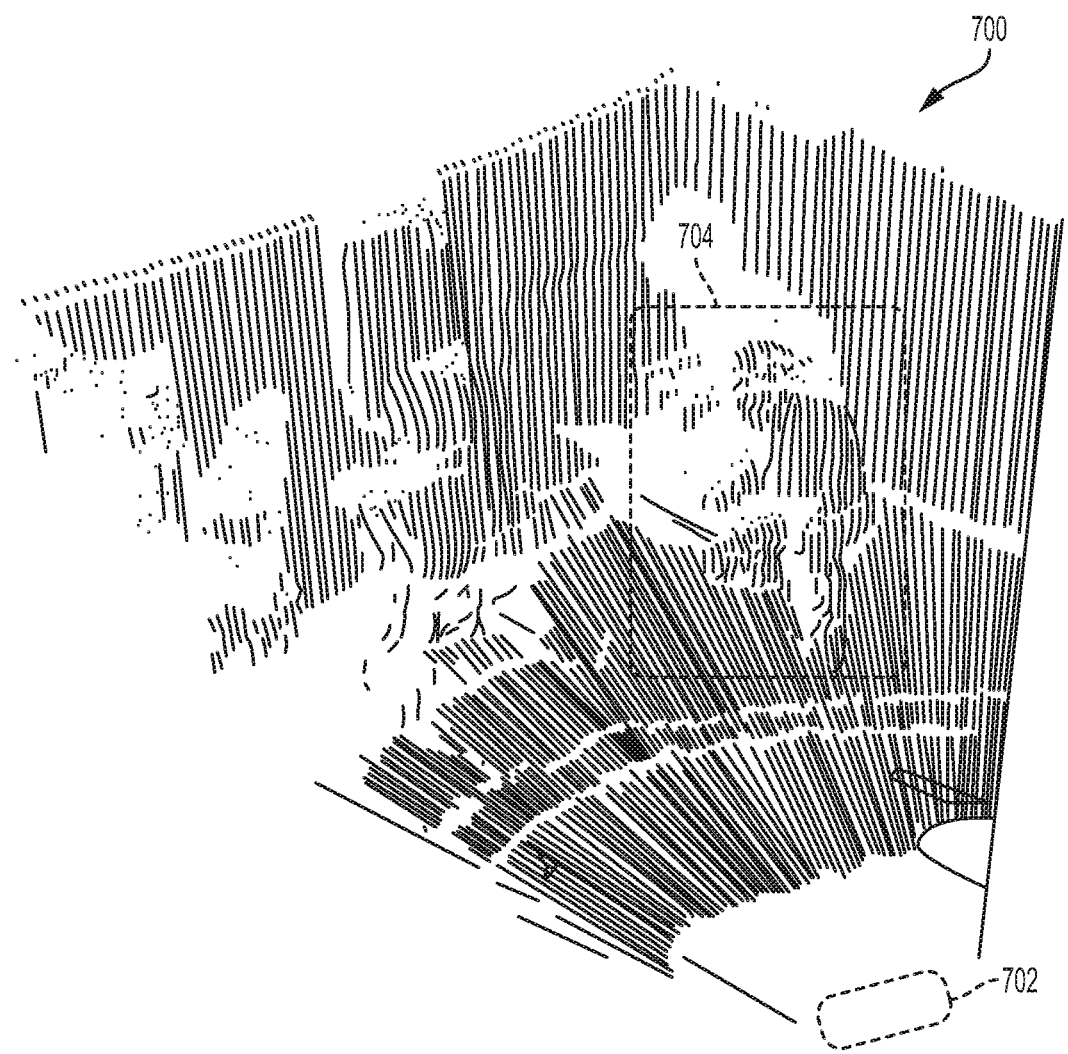
FIG. 7 illustrates a representation of a scene, according to an example embodiment.

FIG. 7 illustrates a representation of a scene 700, according to an example embodiment. As a further illustrative example, FIG. 7 may include a spatial point cloud that may be generated by one or more LIDAR devices as illustrated and described herein. Namely, FIG. 7 may include a blind (unscannable) region 702 and a representation of a person 704.

Figure 8:
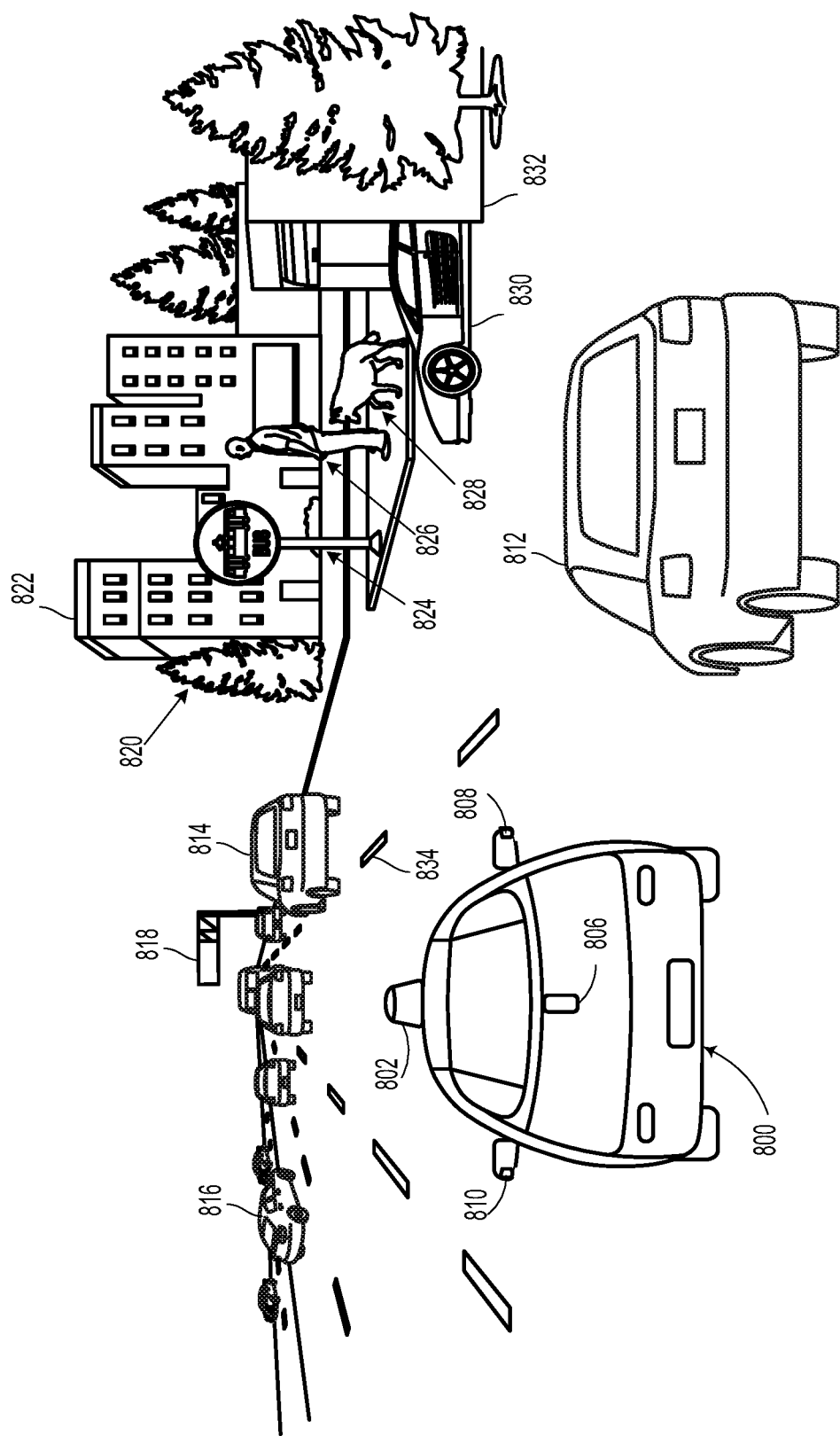
FIG. 8 illustrates a vehicle operating in an environment that includes one or more objects, according to an example embodiment.

FIG. 8 illustrates a vehicle 800 operating in an environment that includes one or more objects, according to an example embodiment. The vehicle 800 may be similar to the vehicle 400. For example, as shown, the vehicle 800 includes sensor units 802, 806, 808, and 810 that are similar, respectively, to the sensor units 402, 406, 408, and 410 of the vehicle 400. For instance, the sensor unit 802 may include a first LIDAR (not shown) and a second LIDAR (not shown) that are similar, respectively, to the first LIDAR 420 and the second LIDAR 422 of the vehicle 400. Further, for instance, each of the sensor units 806-810 may also include a LIDAR similar to the third LIDAR 430 of the vehicle 400. As shown, the environment of the vehicle 800 includes various objects such as cars 812, 814, 816, road sign 818, tree 820, building 822, street sign 824, pedestrian 826, dog 828, car 830, driveway 832, and lane lines including lane line 834. In accordance with the present disclosure, the vehicle 800 may perform the methods and processes herein to facilitate autonomous operation of the vehicle 800 and/or accidence avoidance by the vehicle 800. Below are example scenarios for operation of the vehicle 800 in accordance with the present disclosure.

In a first scenario, the vehicle 800 may detect the road sign 818 using a medium range LIDAR, similar to the first LIDAR 420 of the vehicle 400. In other words, the first LIDAR 420 or another sensor may provide target information to a control system 340 of the vehicle 300. In turn, the vehicle 800 may adjust a viewing direction of a higher resolution LIDAR and/or longer range LIDAR, similar to the second LIDAR 422 of the vehicle 400, to analyze the road sign 818 for information. The higher resolution of the second LIDAR, for instance, may allow resolving the information due to differences of reflectivity of features in the road sign 818. In one instance of the scenario, the road sign may indicate hazards ahead or a closed lane, and the vehicle 800 may adjust its speed or change lanes accordingly. In another instance of the scenario, the road sign may indicate traffic delays ahead, and the vehicle 800 may then instruct a navigation system of the vehicle 800 to determine an alternate route. Other variations of the scenario are possible as well.

In a second scenario, the vehicle 800 may use various sensors to detect and/or identify the various objects illustrated in FIG. 8. The various sensors may provide target information that relates to the environment around vehicle 800. For example, the vehicle 800 may identify the cars 812-816 as moving objects that may be relevant to the navigational behavior of the vehicle 800. Accordingly, the vehicle 800 may use one or more LIDAR systems described herein to track the cars 812-816 and facilitate such navigation. For instance, the vehicle 800 may adjust its speed, or may change lanes to avoid contact with the cars 812-816 based on data from the LIDAR system(s).

In a third scenario, the vehicle 800 may utilize a first LIDAR of the sensor unit 802, similar to the LIDAR 420 of the vehicle 400, to detect and/or identify the car 814 that is within a threshold distance (e.g., medium range of distances) to the vehicle 800. In the scenario, the car 814 may be in the process of changing lanes to the same lane as the vehicle 800. In the scenario, the vehicle 800 may need to adjust its speed and/or change lanes to maintain a safe distance to the car 814. However, data from the first LIDAR may have a first resolution insufficient to detect whether the car 814 is crossing the lane line 834, or may be insufficient to even detect/identify the lane line 834. Thus, in the scenario, the vehicle 800 may adjust a viewing direction of a second LIDAR, which may be similar to the second LIDAR 422 or another LIDAR system described herein, that is included in the sensor unit 802 and that has a higher second resolution than the first resolution of the first LIDAR. In turn, the vehicle 800 may resolve the lane line 834 and/or whether the car 814 is crossing the lane lines. Alternatively, for instance, the vehicle 800 may utilize the higher resolution of the second LIDAR to detect a left light signal of the car 814 to determine that the vehicle 814 is changing lanes among other possibilities.

In a fourth scenario, the car 816 may be driving erratically or moving at a high speed relative to the vehicle 800 among other possibilities. In this scenario, the vehicle 800 may track the car 816 using one or more LIDAR systems described herein, and may navigate accordingly (e.g., change lanes, adjust speed, etc.) to avoid contact with the car 816.

Other scenarios are possible as well. Thus, the present methods and systems may facilitate autonomous operation and/or accidence avoidance for a vehicle such as the vehicle 800 by utilizing a high-resolution LIDAR system configured to provide information about the environment around vehicle 800.

Method Examples

FIG. 9 illustrates a method 900, according to an example embodiment. The method 900 includes blocks that may be carried out in any order. Furthermore, various blocks may be added to or subtracted from method 900 within the intended scope of this disclosure. The method 900 may correspond to steps that may be carried out using any or all of the systems illustrated and described in reference to FIG. 1, 2A, 2B, 3, 4A-4D, or 10-12B. That is, as described herein, method 900 may be performed by a LIDAR system of an autonomous vehicle.

Block 902 includes determining, at an interlock circuit communicatively coupled to a scanning laser system that is emitting light into one or more regions of an environment around the scanning laser system, a respective predicted dosage amount for each region based on the emitted laser light and a pointing direction of the scanning laser system.

Block 904 includes detecting, at the interlock circuit, an interlock condition. In an example embodiment, the interlock condition may include a predicted dosage amount for at least one region being greater than a threshold dose.

Block 906 includes, in response to detecting the interlock condition, the interlock circuit controlling the scanning laser system to reduce a subsequent dosage amount in the at least one region.

In an example embodiment, the scanning laser system may include a pulsed fiber laser configured to emit laser light having an emission wavelength of at least one of: 905 nanometers or 1550 nanometers. Other types of laser systems and emission wavelengths are possible.

In some embodiments, the scanning laser system may be configured to emit the laser light along a scanning path. As an example, one or more regions of the environment around the scanning laser system may correspond to at least a portion of the scanning path.

In an example embodiment, determining the predicted dosage amount for each region may include integrating, over an integration period, at least one of: a continuous beam energy, an average beam energy, or a pulse energy.

In some embodiments, determining the threshold dose may be based on a laser safety standard. For example, the threshold dose may be determined based on ANSI and/or IEC 60825-1 (May 2014) laser safety standards. Other types of laser safety standards are possible.

In an example embodiment, controlling the scanning laser system to reduce the subsequent dosage amount in the corresponding region may include disabling the scanning laser system so that the scanning laser system does not emit laser light. For example, disabling the scanning laser system may include removing power to the scanning laser system and/or removing an enable signal to the scanning laser system. Other ways to disable the scanning laser system are possible.

In an embodiment, the laser scanning system may include an optical element that can be moved into and out of a beam path of the emitted laser light. For example, controlling the scanning laser system to reduce the subsequent dosage amount in the corresponding region may include controlling the scanning laser system to move a beam dump or an optical attenuator into the laser beam path.

In some embodiments, controlling the scanning laser system to reduce the predicted dosage amount in the corresponding region may include changing an operating mode of the scanning laser system. More specifically, changing the operating mode of the scanning laser system could include at least one of: adjusting a beam path of the scanning laser system, adjusting a power output of the scanning laser system, or adjusting at least one pulse characteristic of the scanning laser system.

Although some example embodiments described herein relate to LIDAR systems utilized in autonomous vehicles, it should be understood that similar laser interlock systems and methods could be applied to many other scanning laser applications. For example, contemplated systems and methods include scenarios involving laser mapping, robot navigation, drone aircraft navigation, among many other situations. As a non-limiting example, an indoor household helper robot may include a LIDAR that incorporates a laser safety interlock system as described herein.

In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., of the method described above.

In some embodiments, the disclosed techniques (e.g., method 900) may be implemented by computer program instructions encoded on a computer readable storage medium in a machine-readable format, or on other media or articles of manufacture. In one embodiment, an example computer program product is provided using a signal bearing medium. The signal bearing medium may include one or more programming instructions that, when executed by one or more processors may provide functionality or portions of the functionality described above with respect to FIGS. 1-9. In some examples, the signal bearing medium may be a non-transitory computer-readable medium, such as, but not limited to, a hard disk drive, a Compact Disc (CD), a Digital Video Disk (DVD), a digital tape, memory, etc. In some implementations, the signal bearing medium may be a computer recordable medium, such as, but not limited to, memory, read/write (R/W) CDs, R/W DVDs, etc. In some implementations, the signal bearing medium may be a communication medium (e.g., a fiber optic cable, a waveguide, a wired communications link, etc.). Thus, for example, the signal bearing medium may be conveyed by a wireless form of the communications medium.

The one or more programming instructions may be, for example, computer executable and/or logic implemented instructions. In some examples, a computing device may be configured to provide various operations, functions, or actions in response to the programming instructions conveyed to the computing device by one or more of the computer readable medium, the computer recordable medium, and/or the communications medium.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a scanning laser system configured to emit laser light; and
   an interlock circuit communicatively coupled to the scanning laser system, wherein the interlock circuit carries out operations, the operations comprising:
      as the scanning laser system currently emits laser light into one or more regions of an environment of the scanning laser system, receiving, from the scanning laser system, a respective dosage amount for each region during a current time period;
      storing, at the interlock circuit, the respective dosage amount for each region during the current time period, wherein the interlock circuit comprises one or more histograms corresponding to one or more prior time periods;
      applying, at the interlock circuit, a multiplicative derating factor to the respective dosage amount for each region during the one or more prior time periods, wherein the multiplicative derating factor is based on a minimum pitch amplitude for each region during the one or more prior time periods;
      based on the respective dosage amount for each region during the current time period and the derated respective dosage amount for each region during one or more prior time periods, determining, at the interlock circuit, a respective predicted dosage amount for each region for a future time period;
      detecting an interlock condition, wherein the interlock condition comprises the predicted dosage amount for at least one region for the future time period being greater than a threshold dose; and
      in response to detecting the interlock condition, controlling the scanning laser system to reduce a subsequent dosage amount in the at least one region.

2. The system of claim 1, wherein the system is incorporated into a LIDAR system of an autonomous vehicle.

3. The system of claim 1, wherein the scanning laser system comprises a pulsed fiber laser configured to emit laser light having an emission wavelength of at least one of: 905 nanometers or 1550 nanometers.

4. The system of claim 1, wherein the scanning laser system is configured to emit laser light along a scanning path, wherein the one or more regions of the environment of the scanning laser system correspond to at least a portion of the scanning path.

5. The system of claim 1, wherein the interlock circuit comprises at least one of: a field-programmable gate array (FPGA) or an application-specific integrated circuit (ASIC).

6. The system of claim 1, wherein determining a respective predicted dosage amount for each region for the future time period comprises integrating, over an integration period, at least one of: a continuous beam energy, an average beam energy, or a pulse energy.

7. The system of claim 1, wherein the threshold dose is based on a laser safety standard.

8. The system of claim 1, wherein the scanning laser system comprises an element that can be moved into and out of a beam path of the currently emitted laser light, wherein controlling the scanning laser system to reduce a subsequent dosage amount in the at least one region comprises controlling the scanning laser system to move the element into the beam path, and wherein the element comprises a beam dump or an optical attenuator.

9. The system of claim 1, wherein controlling the scanning laser system to reduce a subsequent dosage amount in the at least one region comprises disabling the scanning laser system so that the scanning laser system does not emit laser light or changing an operating mode of the scanning laser system, wherein changing the operating mode of the scanning laser system comprises at least one of: adjusting a current pointing direction of the scanning laser system, adjusting a power output of the scanning laser system, or adjusting at least one pulse characteristic of the scanning laser system.

10. The system of claim 1, further comprising a power supply, wherein the power supply is configured to provide electrical power to the scanning laser system, wherein controlling the scanning laser system to reduce a subsequent dosage amount in the at least one region comprises disabling the power supply.

11. A method comprising:
   receiving, at an interlock circuit and from a scanning laser system that is currently emitting laser light into one or more regions of an environment of the scanning laser system, a respective dosage amount for each region during a current time period;
   storing, at the interlock circuit, the respective dosage amount for each region during the current time period, wherein the interlock circuit comprises a respective dosage amount for each region during one or more prior time periods;
   applying, at the interlock circuit, a multiplicative derating factor to the respective dosage amount for each region during the one or more prior time periods, wherein the multiplicative derating factor is based on a minimum pitch amplitude for each region during the one or more prior time periods;
   based on the respective dosage amount for each region during the current time period and the derated respective dosage amount for each region during one or more prior time periods, determining, at the interlock circuit, a respective predicted dosage amount for each region for a future time period;
   detecting, at the interlock circuit, an interlock condition, wherein the interlock condition comprises the predicted dosage amount for at least one region for the future time period being greater than a threshold dose; and
   in response to detecting the interlock condition, the interlock circuit controlling the scanning laser system to reduce a subsequent dosage amount in the at least one region.

12. The method of claim 11, wherein the method is performed in a LIDAR system of an autonomous vehicle.

13. The method of claim 11, wherein the scanning laser system comprises a pulsed fiber laser configured to emit laser light having an emission wavelength of at least one of: 905 nanometers or 1550 nanometers.

14. The method of claim 11, wherein the scanning laser system is configured to emit laser light along a scanning path, wherein the one or more regions of the environment around the scanning laser system correspond to at least a portion of the scanning path.

15. The method of claim 11, wherein determining a respective predicted dosage amount for each region for the future time period comprises integrating, over an integration period, at least one of: a continuous beam energy, an average beam energy, or a pulse energy.

16. The method of claim 11, wherein controlling the scanning laser system to reduce a subsequent dosage amount in the at least one region comprises disabling the scanning laser system so that the scanning laser system does not emit laser light.

17. The method of claim 11, wherein the laser scanning system comprises an element that can be moved into an out of a beam path of the currently emitted laser light, wherein controlling the scanning laser system to reduce a subsequent dosage amount in the at least one region comprises controlling the scanning laser system to move the element into the beam path, and wherein the element comprises a beam dump or an optical attenuator.

18. The method of claim 11, wherein controlling the scanning laser system to reduce a subsequent dosage amount in the at least one region comprises changing an operating mode of the scanning laser system, wherein changing the operating mode of the scanning laser system comprises at least one of: adjusting a current pointing direction of the scanning laser system, adjusting a power output of the scanning laser system, or adjusting at least one pulse characteristic of the scanning laser system.

* * * * *